United States Patent
Ionescu et al.

(10) Patent No.: US 9,041,775 B2
(45) Date of Patent: May 26, 2015

(54) APPARATUS AND SYSTEM FOR INTERFACING WITH COMPUTERS AND OTHER ELECTRONIC DEVICES THROUGH GESTURES BY USING DEPTH SENSING AND METHODS OF USE

(75) Inventors: Dan Ionescu, Ottawa (CA); Bogdan Ionescu, Ottawa (CA); Shahidul M. Islam, Ottawa (CA); Cristian Gadea, Manotick (CA); Viorel Suse, Ottawa (CA)

(73) Assignee: Mgestyk Technologies Inc., Ottawa, ON (CA)

( * ) Notice: Subject to any disclaimer, the term of this patent is extended or adjusted under 35 U.S.C. 154(b) by 0 days.

(21) Appl. No.: 13/428,727

(22) Filed: Mar. 23, 2012

(65) Prior Publication Data
US 2012/0242800 A1    Sep. 27, 2012

Related U.S. Application Data

(60) Provisional application No. 61/466,624, filed on Mar. 23, 2011.

(51) Int. Cl.
| | | |
|---|---|---|
| *H04N 13/02* | (2006.01) | |
| *H04N 15/00* | (2006.01) | |
| *G06K 9/00* | (2006.01) | |
| *G06F 3/01* | (2006.01) | |
| *G06K 9/20* | (2006.01) | |

(52) U.S. Cl.
CPC .......... *G06K 9/00375* (2013.01); *G06F 3/017* (2013.01); *G06K 9/2036* (2013.01)

(58) Field of Classification Search
CPC .................. H04N 13/0239; H04N 13/0055
USPC ............................................................ 348/46
See application file for complete search history.

(56) References Cited

U.S. PATENT DOCUMENTS

| | | | |
|---|---|---|---|
| 7,440,590 B1* | 10/2008 | Hassebrook et al. ......... 382/108 |
| 2002/0139853 A1* | 10/2002 | Tsikos et al. ............. 235/462.01 |
| 2004/0129478 A1* | 7/2004 | Breed et al. ................... 180/273 |
| 2004/0193413 A1* | 9/2004 | Wilson et al. ................. 704/243 |
| 2006/0227316 A1* | 10/2006 | Gatt ............................. 356/5.09 |
| 2009/0265670 A1* | 10/2009 | Kim et al. ..................... 715/863 |
| 2010/0053592 A1* | 3/2010 | Yahav et al. ................. 356/4.01 |

(Continued)

OTHER PUBLICATIONS

H. Shimotahira, K. Iizuka, S.-C. Chu, C. Wah, F. Costen, and Y. Yoshikuni, "Three-dimensional laser microvision," Appl. Opt. 40, 1784-1794 (2001).

(Continued)

*Primary Examiner* — Chikaodili E Anyikire
(74) *Attorney, Agent, or Firm* — MU Patents; Timothy Marc Shropshire

(57) ABSTRACT

Disclosed herein are systems and methods for gesture capturing, detection, recognition, and mapping them into commands which allow one or many users to interact with electronic games or any electronic device interfaces. Gesture recognition methods, apparatus and system are disclosed from which application developers can incorporate gesture-to-character inputs into their gaming, learning or the like applications. Also herein are systems and methods for receiving 3D data reflecting hand, fingers or other body parts movements of a user, and determining from that data whether the user has performed gesture commands for controlling electronic devices, or computer applications such as games or others.

21 Claims, 21 Drawing Sheets

(56) References Cited

U.S. PATENT DOCUMENTS

2012/0038549 A1* 2/2012 Mandella et al. ............. 345/156
2012/0262381 A1* 10/2012 Hirsch et al. ................. 345/173

OTHER PUBLICATIONS

T. Kanamaru, K. Yamada, T. Ichikawa, T. Naemura, K. Aizawa, and T. Saito, "Acquisition of 3D image representation in multimedia ambiance communication using 3D laser scanner and digital camera," in Three-Dimensional Image Capture and Applications III, B. D. Corner and J. H. Nurre, eds., Proc. SPIE 3958, 80-89 (2000).

D. A. Green, F. Blais, J.-A. Beraldin, and L. Cournoyer, "MDSP: a modular DSP architecture for a real-time 3D laser range sensor," in Three-Dimensional Image Capture and Applications V, B. D. Corner, R. P. Pargas, and J. H. Nurre, eds., Proc. SPIE 4661, 9-19 (2002).

V. H. Chan and M. Samaan, "Spherical/cylindrical laser scanner for geometric reverse engineering," in Three-Dimensional Image Capture and Applications VI, B. D. Corner, P. Li, and R. P. Pargas, eds., Proc. SPIE 5302, 33-40 (2004).

U. R. Dhond and J. Aggarwal, "Structure from stereo—a review," IEEE Trans. on Systems, Man and Cyber., vol. 19, pp. pp. 1489-1510, Nov./Dec. 1989.

R. A. Jarvis, "A perspective on range finding techniques for computer vision," IEEE Trans. Pattern anal. Machine Intel., vol. 5, pp. pp. 122-139, Mar. 1983.

Davie Elad and Scmuel Einav "Three-dimensional measurement of biological surfaces", ISPRS Journal of Photogrammetry and Remote Sensing, 45 (1990) 247-266, Elsevier Science Publishers B.V., Amsterdam.

D. Bergmann, "New approach for automatic surface reconstruction with coded light", in: T.F. Schenck (Ed.), Proceedings of Remote Sensing and Reconstruction for Three-Dimensional Objects and Scenes, vol. 2572, SPIE, San Diego, CA, 1995, pp. 2-9.

T. Abe, K. Tokai, Y. Yamaguchi, O. Nishikawa, and T. Iyoda, "New range finder based on the re-encoding method and its application to 3D object modeling," in Three-Dimensional Image Capture and Applications V, B. D. Corner, R. P. Pargas, and J. H. Nurre, eds., Proc. SPIE 4661, 20-29 (2002).

T. Azuma, K. Uomori, and A. Morimura, "Real-time active range finder using light intensity modulation," in Three-Dimensional Image Capture and Applications II, B. D. Corner and J. H. Nurre, eds., Proc. SPIE 3640, 11-20 (1999).

J.-T. Oh, S.-Y. Lee, and S.-W. Kim, "Scanning projection grating moiré topography," in Three-Dimensional Image Capture and Applications III, B. D. Corner and J. H. Nurre, eds., Proc. SPIE 3958, 46-51 (2000).

P. Lavoie, D. Ionescu, E. Petriu, "3-D Object Model Recovery From 2-D Images Using Structured Light," Proc. IMTC/96, IEEE Instrum. Meas. Technol. Conf., pp. 377-382, Brussels, Belgium, 1996.

P. Lavoie, D. Ionescu, and E. M. Petriu, "3D object model recovery from 2D images using structured light," IEEE Transactions on Instrumentation and Measurement, vol. 53, 2004.pp. 437-445.

Philippe Lavoie, Dan Ionescu, Emil Petriu: "Constructing 3D Virtual Reality Objects from 2D Images of Real Objects Using NURBS" in Proceedings of IEEE International Conference on Virtual Environments, Human Computer Interfaces, and Measurements Systems VECIMS 2007, Jun. 27-Jul. 31, 2007 Ostuni, Italy, pp. 117-125.

Masahiro Kawakita, Keigo Iizuka, Rei Iwama, Kuniharu Takizawa, Hiroshi Kikuchi, Fumio SatoGain-modulated Axi-Vision Camera (high speed high-accuracy depth-mapping camera) Optic Express, vol. 12, No. 22, Oct. 2004, pp. 5336-5344.

\* cited by examiner

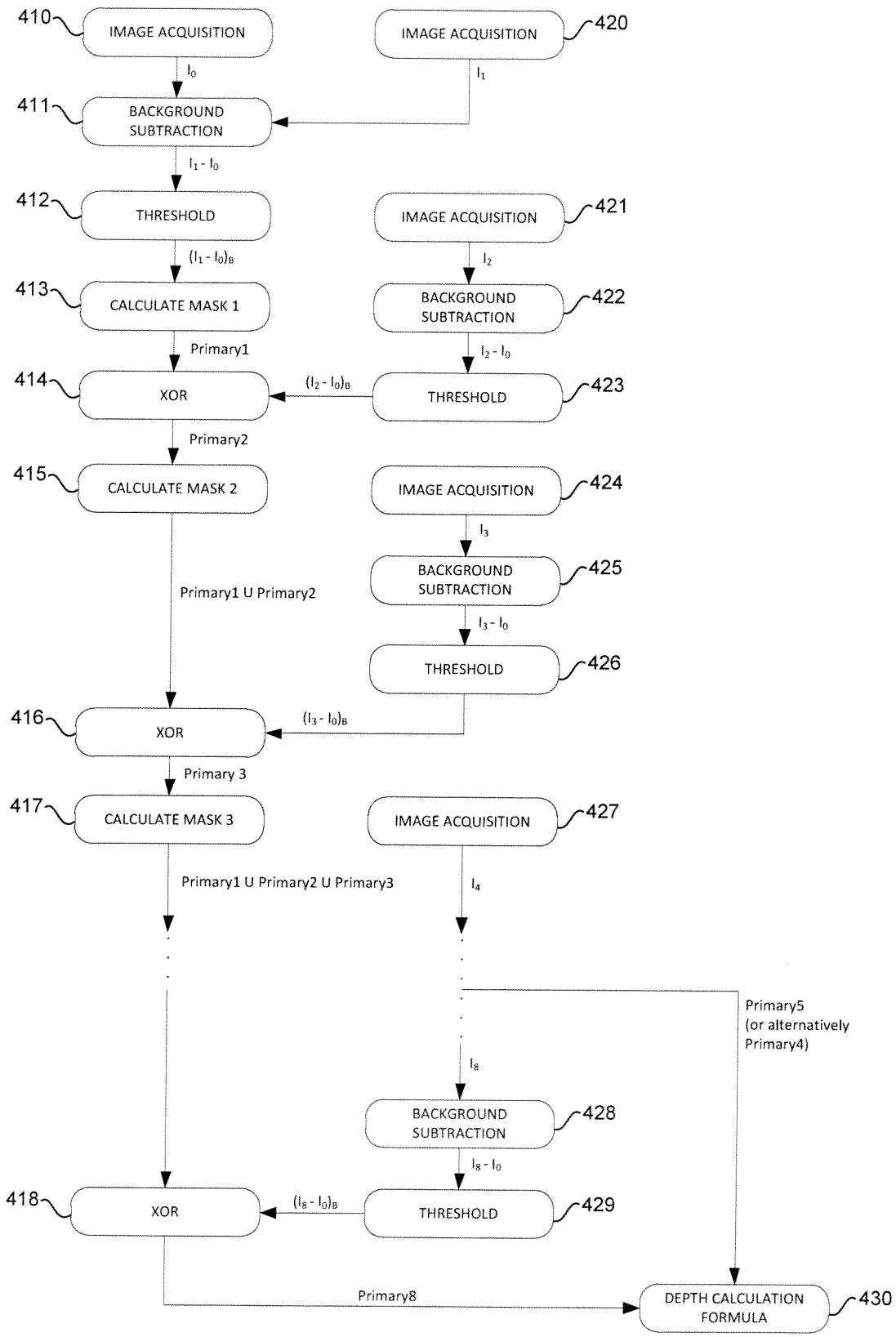

APPARATUS AND SYSTEM FOR INTERFACING WITH COMPUTERS AND OTHER ELECTRONIC DEVICES THROUGH GESTURES BY USING DEPTH SENSING AND METHODS OF USE

This application claims priority from U.S. provisional patent application U.S. 61/466,624 filed on Mar. 23, 2011 entitled "Methods, Apparatus, and System for Depth Measurement and Gesture Control of Electronic Devices and Computer Applications," which is incorporated by reference herein in its entirety.

I. BACKGROUND OF THE INVENTION

A. Field of Invention

The invention relates to the apparatus, method, system, and applications of interfacing computers, various electronic devices, and/or other systems with people using gesture or body, or body parts movements based controls which in some embodiments can be structured as a language, and which are interpreted by the interface which in a particular case can contain a depth-map generator device, which may be a specialized 3D (three-dimensional) image generating camera and a processing device to detect, identify, and understand the gesture command.

B. Description of the Related Art

The field of 3D objects reconstruction has been investigated thoroughly by the academia and industry and results of the efforts put so far in this field are abundant. Hereafter a brief overview is given. Various methods are known in the art for 3D object reconstructions and/or depth measurement of points and surfaces of real objects using image capturing devices, controlled light environment or structured light generators, and computers. Named also optical 3D mapping, the generation of a 3D profile of the surface of an object by processing the optical image of that object has been for a long time the subject of numerous scientific works and patents. There is a vast literature on the subject of depth mapping methods. The most straight forward scheme combines a distance measuring device with a scanning method and system. In this category are 3D laser micro-vision] for micro objects and laser scanners for macro objects.

Another approach that has been studied extensively is depth mapping based on triangulation. Triangulation methods require mathematical manipulation in order to obtain the depth information. Another interesting scheme for depth mapping involves the projection of structured patterns. A structured pattern is projected over an object and from the distortion of the projected pattern, the surface shape of the object is determined. Various kinds of projected patterns have been used, including stripe, sinusoidal, coded, spatially intensity modulated, pseudo-random grid, and Moiré patterns.

All-solid-state imaging range cameras were proposed in technical publications or patents like U.S. Pat. Nos. 4,687,325, or 5,682,229 and others. The Time-of-Flight method was used to produce a depth map of the object by sending invisible optical radiation on the object and capturing with an image capturing device the reflected radiation on which a processing device calculated the time needed by the optical radiation to travel to the object and for the reflected image to be captured by the image capturing device, the optical radiation emitting device and the capturing device being practically mounted together on the same location on the apparatus. The following patents were filled in U.S. Pat. Nos. 7,224,384 B1, 7,671,391 and others. Some technologies were produced and patented for various types of image capturing devices such as the U.S. Pat. No. 7,688,944 B2.

Some methods are based on generating a precisely timed beam of energy emitted from a single source with the beam illuminating the scene, while the reflected energy from the beam is detected with a camera whose sensitivity is precisely timed and synchronized with the emitted beam. The reflected energy is separated and segregated according to the time of arrival at the camera as for example in the U.S. Pat. No. 5,081,530. One or more cycles of energy are emitted; the camera segregates reflected energy during each cycle by separately storing the energy detected before and after a given time. The ratio of two consecutive separately detected energies conveys depth or third dimension information which is processed according to a special algorithm. Signals can be displayed to a viewer to create a stereoscopic image or used by a machine for automatic response to a three dimensional environment.

Some methods, and system were based on projecting a grid of a randomly organized speckle of dots, called a Pseudo-Random Binary Array (PRBA) which is generated by a light source traversing a transparent plastic sheet on which the PRBA was imprinted. The depth of the points on the object surface is calculated by processing the information contained in the dots present on the object image acquired by an image acquisition device and a reference image of a calibrated PRBA pattern imprinted on the transparent plastic sheet. A coarse disparity map is generated by the image processing algorithm which is called a coarse (3D) depth map. Using the epipolar geometry, the camera model and the Fundamental Matrix a stereo fusion algorithm based on Dynamic Programming technique combined with autoregressive modeling allows to reconstruct a 3D epipolarized image of the object with high precision (in a range of tens of tau). A de-epipolarization method is finally providing the real 3D image of the object. The method is repetitively applied until all 3D views of the object are reconstructed. This technique is prior art for the U.S. Pat. No. 6,751,344, Patent Applications US 2008/0240602, U.S. Provisional Patent Application 61/016,832, U.S. patent application Ser. No. 11/899,542, U.S. Provisional Patent Application 60/909,487, and International Publication WO 2007/043036.

Some other methods and system also published were based on colored PRBA grid of randomly organized and differently colored lines which were projected on a real object, the grid being generated by a light source traversing a transparent plastic sheet on which the colored PRBA grid was imprinted. An image acquisition unit detects the light response of the illuminated region of the object and generates image data. Deformations of the colored grid pattern as projected on the object are compared with a reference image of the pattern as projected on the real object, in real-time and from the above comparison a set of control points is obtained, which then were used for the calculation of 3D surfaces which displayed on the visualization unit represent the 3D map of the object in three dimension and displayed graphically on the computer screen.

Some other methods and system also published and which were using pulsed laser light triggered by a function generating device and a gain-modulated camera. Objects are illuminated by the infrared pulsed laser. The gain of the camera that captures an image of the objects is linearly increased with respect to time. Thus, the light reflected from farther distances is amplified with a larger camera gain than that from nearer distances. The output image intensity of far objects is higher than that of near objects. The image intensity represents the distance to the object. With an increase in the speed of the camera gain modulation, the sensitivity of the depth measurement is increased.

Some methods are based on projecting a laser speckle pattern onto the object, and then analyzing the image of the pattern as projected on the object. For example, PCT International Publication WO 2007/043036, describes a system and method for object reconstruction, in which a coherent light source and a generator of a random speckle pattern projects onto the object a coherent random speckle pattern. An imaging unit detects the light response of the illuminated region and generates image data. Deformations of the pattern as projected on the object are compared with a reference image of the pattern in real-time and from the above comparison a 3D map of the object is calculated leading eventually to a 3D image of the object.

Variations of the above principles are used as in the PCT International Publication WO 93/03579 which describes a three-dimensional vision system in which one or two projectors establish structured light comprising two sets of parallel stripes having different periodicities and angles, while the U.S. Pat. No. 6,751,344 describes a method for optically scanning a subject in which the subject is illuminated with a matrix of discrete two-dimensional image objects, such as a grid of dots. Other methods involve projection of a grating pattern, as described, for example, in U.S. Pat. No. 4,802,759. Noticeable for all grid pattern based methods is that the precision of the reconstructed object suffers due to the discrete information extracted from the intersection points of the object and grid pattern.

Many computing applications such as electronic games, learning, multimedia, office applications or the like, or consumer electronic devices use various control methods either through computer commands or specific radiations for allowing users to manipulate game characters or other aspects of computer applications, or to control consumer electronic devices. Typically such controls are applied to the above computer applications or electronic devices using, for example, remotes controllers, keyboards, mice, joysticks or the like. Unfortunately, such control devices do not map directly to the spirit of the actual game or other application actions, or the spirit of naturally using electronic devices for which the controls are used. For example, a game control that causes a game character to either drive a car, fight in a fencing game, swing a baseball bat may not correspond to an actual motion of driving the car, fighting in a duel, or swinging the baseball bat. A new paradigm for human computer interface is therefore necessary.

II. SUMMARY OF THE INVENTION

The following summary is made by way of example and not by way of limitation. Disclosed herein are apparatus, systems and methods for building a 3D map of one or more objects, which in a particular case can be humans who are present in the field of view (FOV) of an optical device whose images are projected onto an image sensing device, which provides the electronic image to a reconfigurable architecture device, which comprises an image capturing device, and in some embodiments can also process the 3D map or the RGB image of one or more objects present in the FOV using image processing methods, for example to detect and identify the user faces, and then provides the 3D map, together or no with the results of the image processing, to an embedded processor which processes the image using image processing methods for the detection, recognition and interpretation of the gesture made, and produces a command corresponding to the position and movement of the object or objects in the FOV to an electronic device which has an interface to receive the commands. At the same time, the novel apparatus, methods, devices and systems that are used in these embodiments make it possible to use them in combination with the devices which produce movement generated signals such as accelerometers, gyroscopes, magnetometers, and alike, as well as in combination with a voice capturing and recognitions device, by applying data fusion methods specific to the methods used in this invention, in order to produce more complex commands. The commands are further used for controlling consumer electronic devices such as TV or set-top boxes sets, PC and PC applications or gaming consoles, or computer applications such as electronic games or alike.

There is therefore provided, in accordance with an embodiment of the present invention, apparatus, methods, and system for generating the 3D map of an object placed in the field of view of the image capturing device, for processing the 3D map to detect identify and recognize the movements of the objects present in the FOV, for mapping the detected movement onto a command which is sent by the device to another electronic device including:

a controlled-modulated illumination assembly, including:

a set of radiation generating devices. Alternately, the controlled-modulated illumination assembly may include lasers or light-emitting diodes (LEDs);

an electronic circuit to control the width of the period that the radiation generating devices are lit, and its intensity;

a reconfigurable architecture hardware which controls the parameters of the image sensing device and also the radiation generating device using an algorithm based on a monotonic increasing law, captures the image generated by the image sensing device, stores the images in the information storage device and builds the 3D map of the object illuminated by the radiation generated by the radiation generating device by calculating consecutive sliced views of the object based on the reflected radiation for each of the radiation intensities, and sends the 3D map of the object to the processor or in another embodiment the reconfigurable architecture hardware can include image processing methods applied to the 3D map obtained;

an information storage device connected to the reconfigurable architecture hardware device;

a processor connected to the reconfigurable architecture hardware device, processor which processes the 3D image by applying various image processing algorithms on a three-dimensional (3D) map of the object or objects in order to analyze and identify the gestures produced by the user (s) and synthesize an appropriate command to control consumer electronic devices connected to the apparatus. The processor uses an information storage device in the process of applying various image processing algorithms for detecting and recognizing the movement present in the FOV.

an information storage device connected to the processor;

a communication assembly where the communication with the external devices such as PCs, gaming consoles, TV sets, set-top boxes and the like is done via various standard communication ports such as Ethernet, USB, WiFi, WiMax, Bluetooth, Infrared blaster, and the like.

In a disclosed embodiment, the reconfigurable architecture hardware is arranged to acquire images from the image capturing device, store them in the information storage device and process a succession of images captured while the object is illuminated by the controlled-modulated illuminating device in a spatial succession imposed by a specific distance sampling arrangement, so as to create a 3D map of the object.

In a disclosed embodiment, the processor is arranged together with its information storage device to process a succession of 3D images produced by the reconfigurable architecture hardware while the object is moving so as to map a 3D movement of the object, wherein the object is a part of a human body, and the 3D movement includes a gesture made by the part of the human body, and wherein the processor is coupled to provide an input to a consumer electronic device such as a game console or a TV or a set-top box, or a mobile device or a computer application responsive to the gesture movement of the object.

There is also provided, in accordance with an embodiment of the present invention, apparatus and system for mapping an object, including:

an illumination assembly, including:

a controlled-modulated device which produces in a controlled way a succession of radiation pulses whose duration increases as the object is sampled by various pulses of constant intensities along a frame, but monotonically increasing with every frame, up to the prescribed sampling density, and, a radiation source, which is configured to illuminate the object according to the optical radiation prescribed by the controlled-modulated device so as to project the depth sampling pulses onto the object;

an image sensing assembly, which is configured to provide a series of images of the object or objects present in the FOV of the optical device and whose parameters are controlled by the reconfigurable architecture hardware using an algorithm which takes into account the distance to the object and the quality of the image obtained by capturing the reflected radiation from the object.

a reconfigurable architecture hardware which: controls the parameters of the image sensing device and also the radiation generating device using hardware based functions generating a monotonic increasing law for the pulses produced by the radiation generating device in correspondence with the distance of the object, captures the image generated by the image sensing device, stores the images generated by the image capturing device in an information storage device and builds the 3D map of the object illuminated by the radiation generated by the radiation generating device, by processing consecutive sliced views of the object based on the reflected radiation for each of the radiation intensities, corrects the lens edge effects, and by calculating the depth of each point in the above images, generates a 3D map of the visible (by the image sensing device of the apparatus and system) part of the object and sends the resulting 3D map of the visible part of the object to the processor of the device.

In addition to the above embodiment of the device and system described above at point [0025] in another embodiment of the invention an embedded image processing device can be added to the device described in this patent and system above, as the item 204 of FIG. 2, including:

a processor which is coupled with the reconfigurable architecture hardware and which processes the 3D image produced by the latter by applying various image processing algorithms on a three-dimensional (3D) map of the object in order to analyze, identify and interpret the gestures produced by the user (s) and to synthesize an appropriate command to control consumer electronic devices such as game consoles. TV sets or set-top boxes, or mobile computer of phones, or any computer application. The processor uses an information storage device in order to apply various image processing algorithms and move the RGB and depth map images inside the device and to send them out to monitors or other processing units such as processors, PCs, consoles or the like.

an information storage device connected to and used by the processor in order to store various images needed to produce the result of the gesture interpretation algorithm.

In one embodiment, the radiation produced by the radiation generating device includes an algorithm based on a monotonic increasing law for the pulses produced by the radiation generating device which is reflecting the way the object is sampled in the z axis direction. The sampling rate can be either $s_r=4$ or $s_r=8$.

Typically, the pulses are such as a duty cycle that is less than 1/e is accomplished. Alternatively or additionally, the radiation pulses have a duty cycle that varies within frames however is constant during a frame.

In some embodiments, the reconfigurable architecture hardware is configured to derive the 3D map by finding respective discrete depth maps of the object based on the reflected radiation by the object, and by reconstructing, based on the above, a complete depth map of the object. In one embodiment, the reflected radiation follows a duty cycle pattern as imposed by the reconfigurable architecture hardware that varies monotonically from a discrete radiation and frame to the other, and the reconfigurable architecture hardware is configured such as to determine local gray levels of the discrete frame responsively to the radiation pulse duty cycle, and to calculate the depth map in a discrete way based on the local gray levels of the respective captured frame by the image sensing device.

There is additionally provided, in accordance with an embodiment of the present invention, a method for building a 3D mapping of an object, including:

a controlled-modulated device containing an algorithm for modulating the radiation pulses following a discrete monotonic law concerning the width and duty cycle of the radiation devices, such as illuminate the object with variable radiation intensities which are maintained constant along a frame which captures the reflected radiation by the object.

an image sensing device which captures the discrete image of the sampled object image along the z axis, an information storage device connected to the reconfigurable architecture hardware, which stores discrete images of the object as sent to the information storage device by the reconfigurable architecture hardware.

a reconfigurable architecture hardware which controls the emitting radiation device, the image sensing device, stores in the information storage device the discrete images representing the discrete image of the object as produced by a single train of radiation pulses modulated such that the pulses width is kept constant along a frame, and eventually processes the captured images so as to reconstruct a three-dimensional (3D) map of the object, and conveys the result in form of a 3D map to the processing device which can be any CPU endowed device such a PC or a laptop, or even and embedded processor which applies specific image processing algorithms as described in this invention such that the gestures made by the user are properly identified and mapped into commands which can control either consumer electronic devices such as TV and set-top boxes sets or computer applications.

There is additionally provided, in accordance with an embodiment of the present invention, a method, and apparatus, for building a command to control the external electronic devices such as game consoles, TV sets, set-top boxes, PCs, mobile phones or alike, or computer applications such as electronic games, digital signage, or alike based on processing the 3D mapping of an object, including:

a processor or any CPU based board which is coupled with the reconfigurable architecture hardware via USB, Wi-Fi, or even directly and which processes the 3D image produced by the latter so as to process by applying various image processing methods on a three-dimensional (3D) map of the object in order to detect, analyze and identify the gestures produced by the user(s) and synthesize an appropriate command to control consumer electronic devices such as TV or set-top boxes sets or any computer application. The processor, CPU or alike uses an information storage device in order to apply various image processing methods.

an information storage device connected to and used by the processor in order to store various images needed to produce the result of the gesture interpretation algorithm.

There is further provided, in accordance with an embodiment of the present invention, a method for 3D mapping an object which is further used by the apparatus and system for the control of PCs or a gaming console including:

a radiation generating assembly, including:

an illuminating control algorithm implemented onto the reconfigurable architecture hardware through which it controls the radiation generating devices such that they produce reflected radiation by the object with a specific width of the radiation pulses in correspondence with the specific discrete part of the object whose 3D image has to be reconstructed.

an image sensing device which produces an image produced by the reflected radiation off the object, and which is produced by the radiation that is projected onto the object;

processing the captured image by the reconfigurable architecture hardware so as to reconstruct a three-dimensional (3D) map of the object.

an information storage device connected to and used by the processor in order to store various images needed to produce the result of the gesture interpretation algorithm.

a processor which is connected to the reconfigurable architecture hardware and which processes the 3D image produced by the latter so as to process by applying various image processing algorithms on a three-dimensional (3D) map of the object in order to analyze and identify the gestures produced by the user (s) and synthesize an appropriate command to control consumer electronic devices such as TV or set-top boxes sets or any computer application. The processor uses an information storage device in order to apply various image processing algorithms.

An application programming interface is shipped out by the processor and provides the PC, laptop, mobile phone or any CPU of gaming consoles, or other electronic devices the command used to control consumer electronic devices such as TV sets, set-top boxes, laptops, mobile phones or the CPU of gaming consoles, robots and any other devices controlled by a CPU or Wi-Fi, IR blasters, and alike, or to any computer applications such as games, digital signage, learning and alike.

The present invention will be more fully understood from the following detailed description of the embodiments thereof, taken together with the drawings.

III. BRIEF DESCRIPTION OF THE DRAWINGS

The invention may take physical form in certain parts and arrangement of parts, embodiment of which will be described in detail in this specification and illustrated in the accompanying drawings which form a part hereof and wherein:

FIGS. 1A-1E are schematic, pictorial illustrations of the methods, apparatus, and system for depth measurement used for gesture control of electronic devices and computer applications, based on a depth image built by the method and apparatus, of a real object and on which depth image the apparatus uses image processing methods in order to perform gesture interpretations based on a predefined gesture language, which can be flexibly matched to commands for controlling a consumer electronic device or a computer application in accordance with the embodiments of this present invention;

Figure 1A:
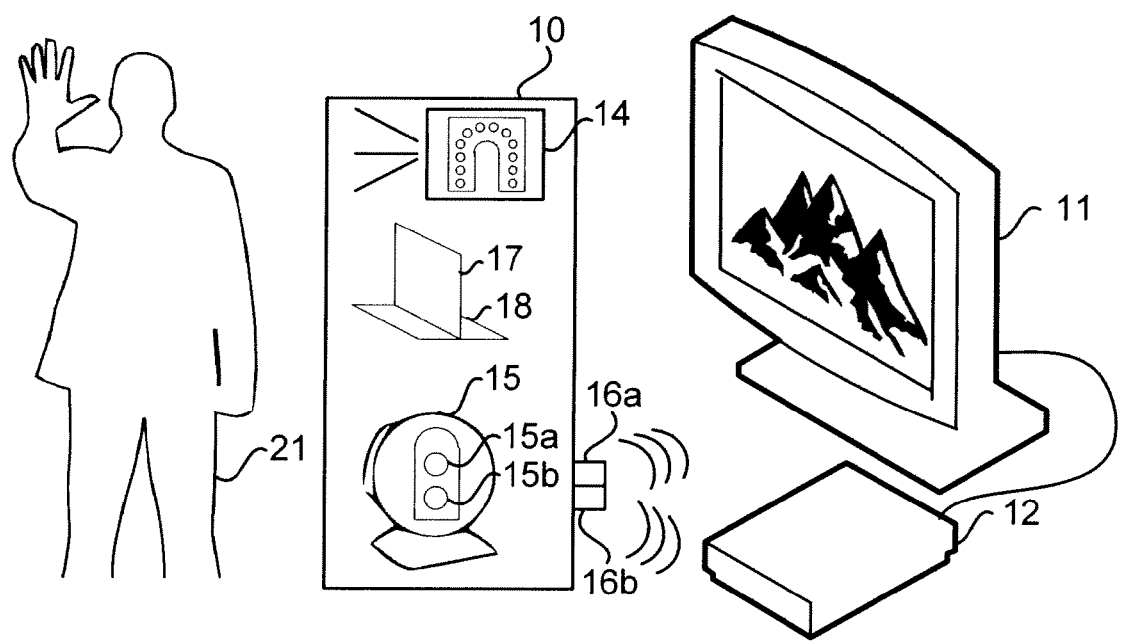
FIG. 1A is a schematic, pictorial illustration of the apparatus and system for 3D mapping, used to control consumer electronic devices such as TV sets or set-top boxes or alike using hand and finger gestures in accordance with an embodiment of the present invention.
Figure 1B:
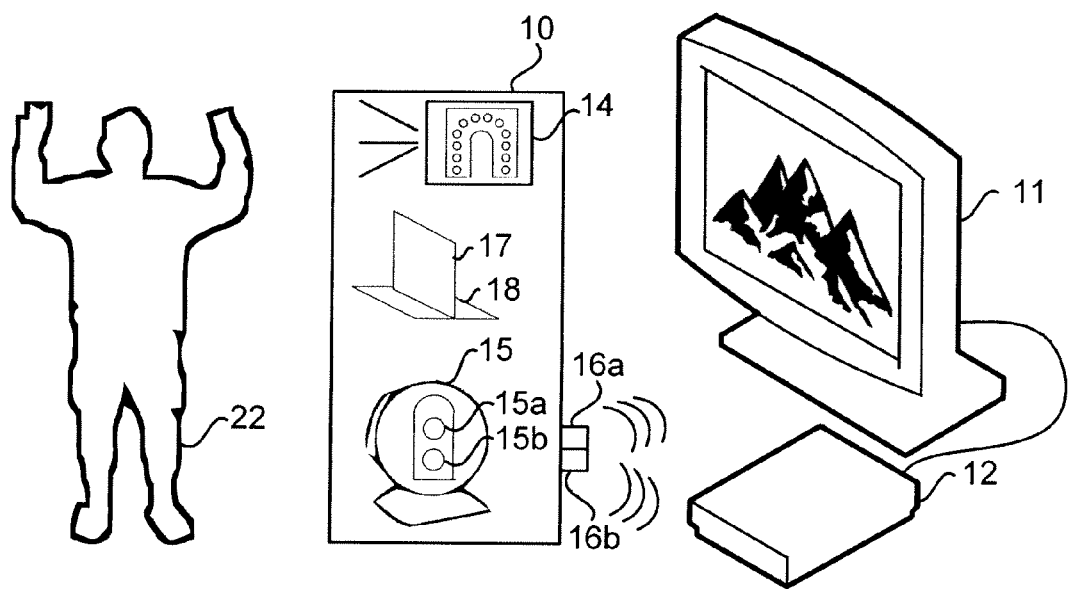
FIG. 1B is a schematic, pictorial illustration of the apparatus and system for 3D mapping, used to control consumer electronic devices such as TV sets or set-top boxes using gestures made moving various body parts in accordance with an embodiment of the present invention.
Figure 1C:
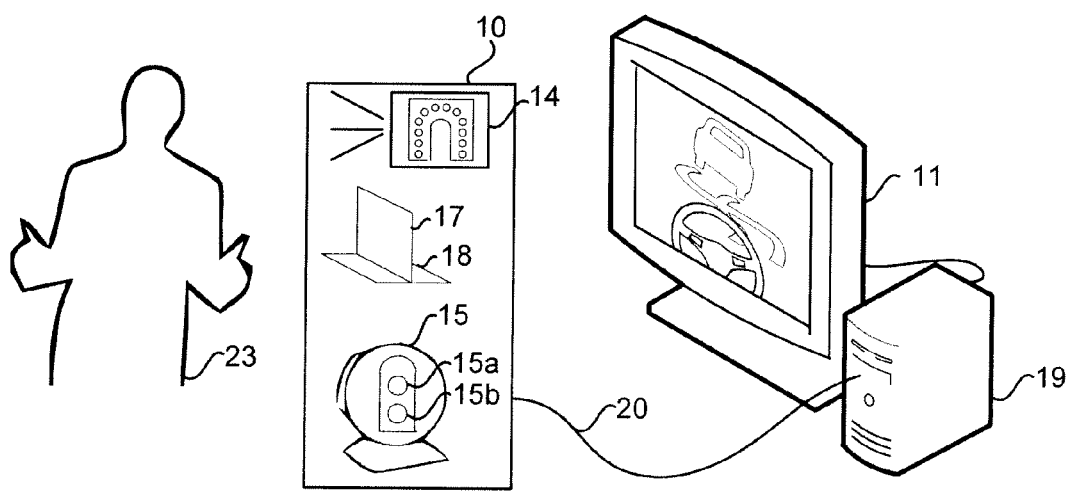
FIG. 1C is a schematic, pictorial illustration of the apparatus and system for 3D mapping, used to control PC applications using gestures made using hand and finger gestures or gestures made by moving various body parts in accordance with an embodiment of the present invention.
Figure 1D:
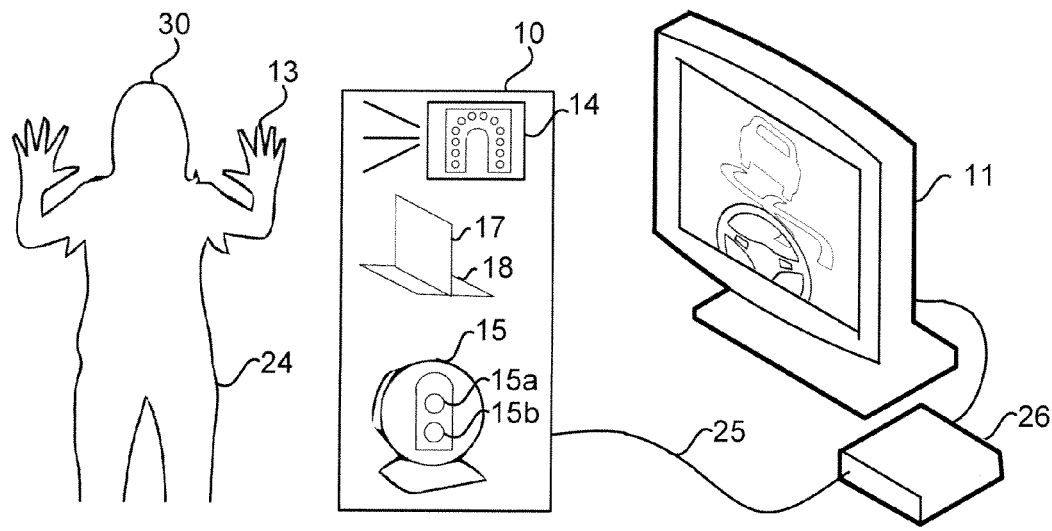
FIG. 1D is a schematic, pictorial illustration of the apparatus and system for 3D mapping, used to control console based electronic games or any computer applications using gestures made using hand and finger gestures or gestures made by moving various body parts in accordance with an embodiment of the present invention.
Figure 1E:
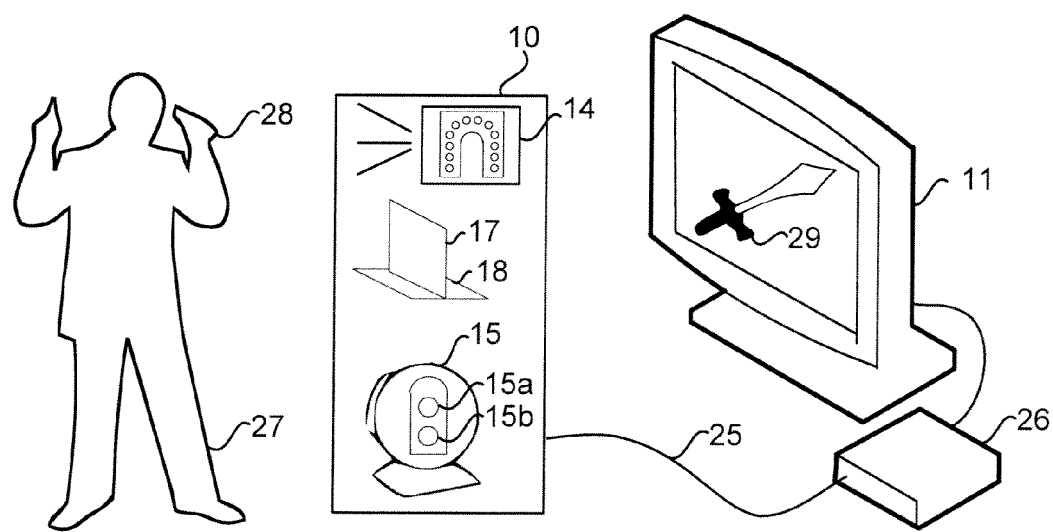

FIG. 1E is a schematic, pictorial illustration of the apparatus and system for 3D mapping, used to control console based games or any other PC game or applications by fusing a data related to gestures or body parts movements produced by the apparatus and system in accordance with an embodiment of the present application, and data produced by other sensors such as accelerometer, gyroscopes and alike which are enclosed in an electronic game controller.

Figure 2:
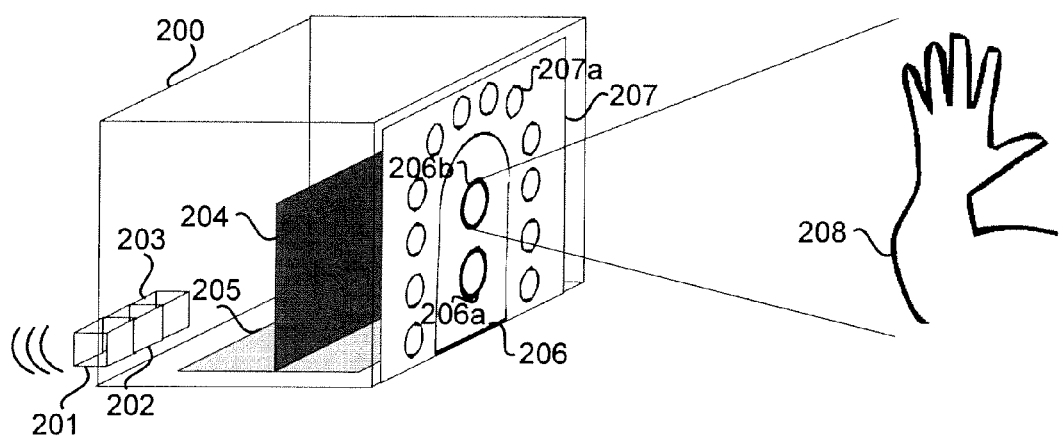
Figure 3A:
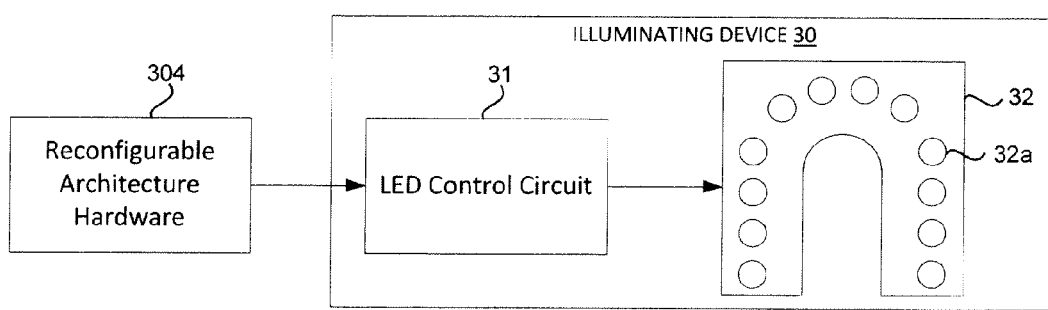
Figure 3B:
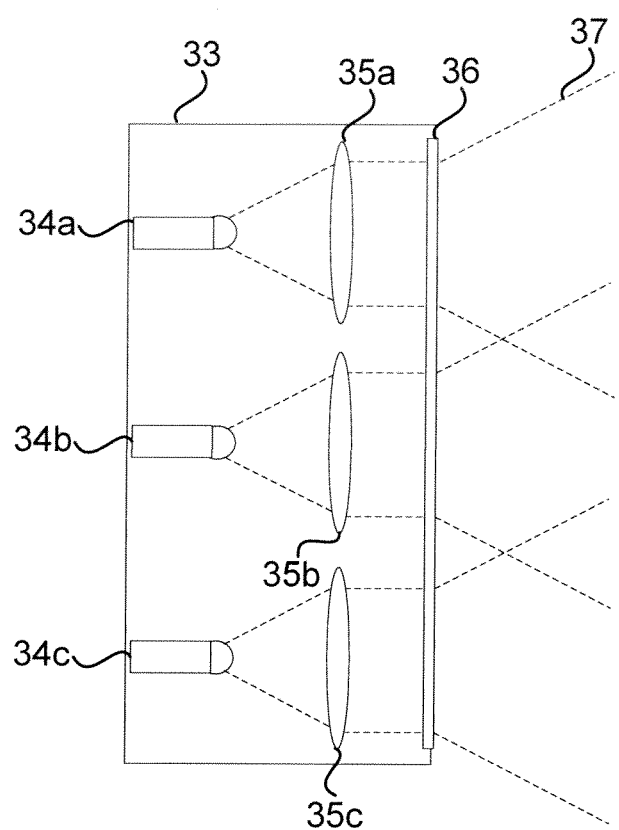
Figure 3C:
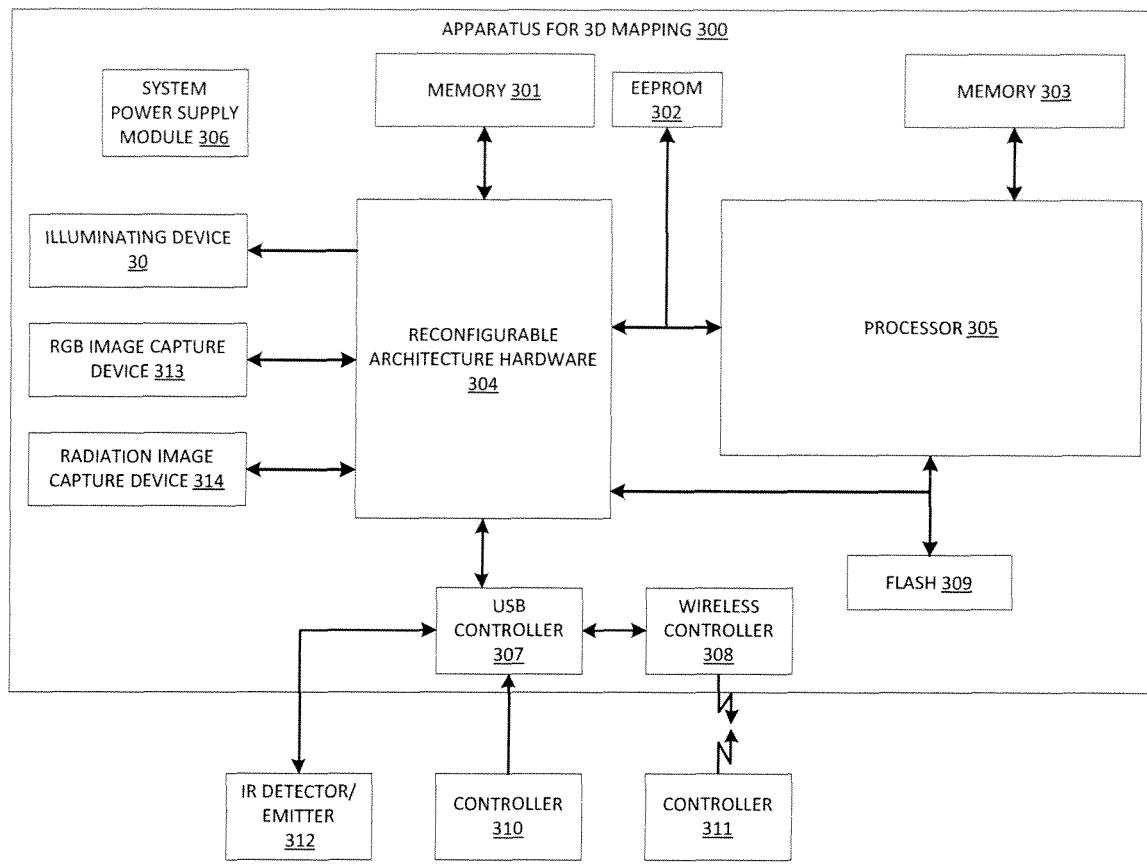
Figure 3D:
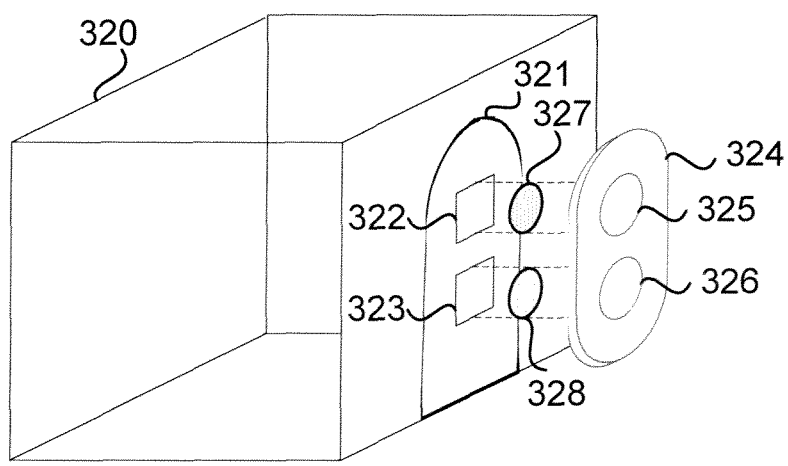
Figure 4A:
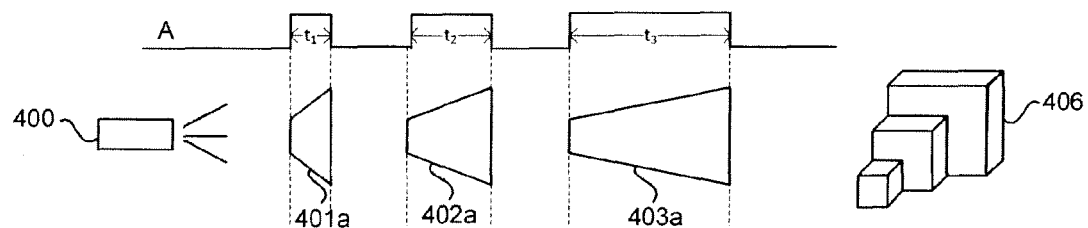
Figure 4B:
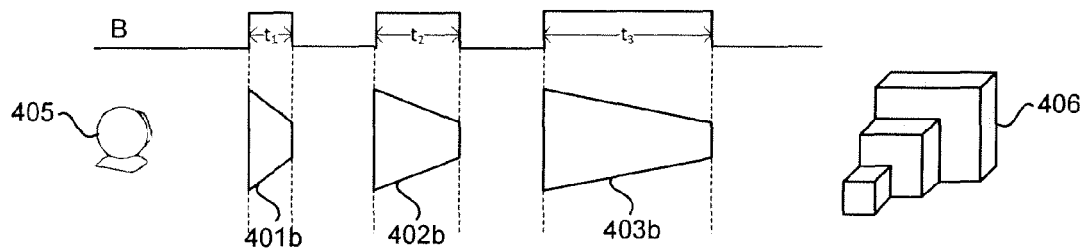
Figure 4C:
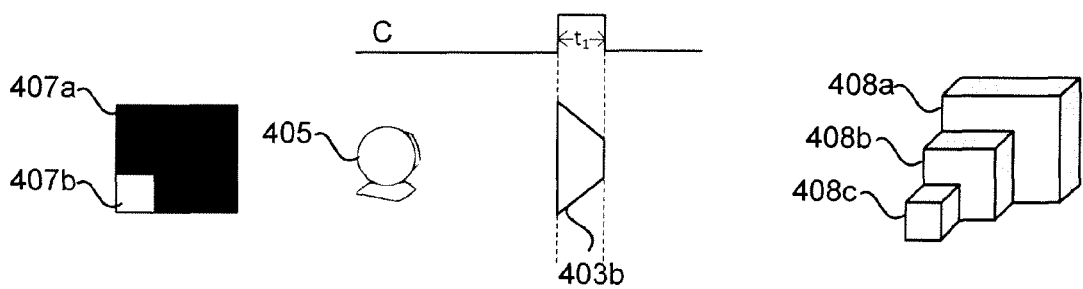
Figure 4D:
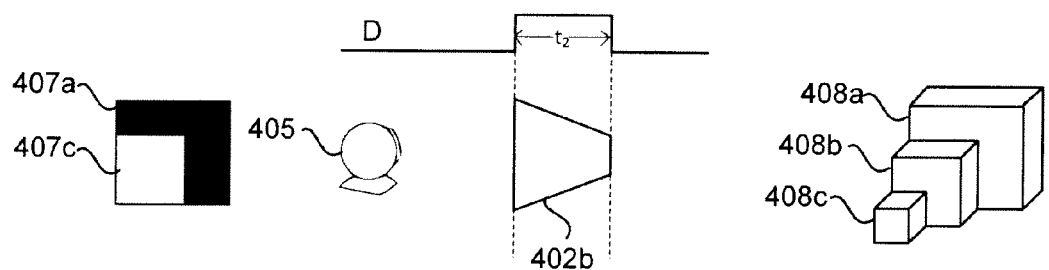
Figure 4E:
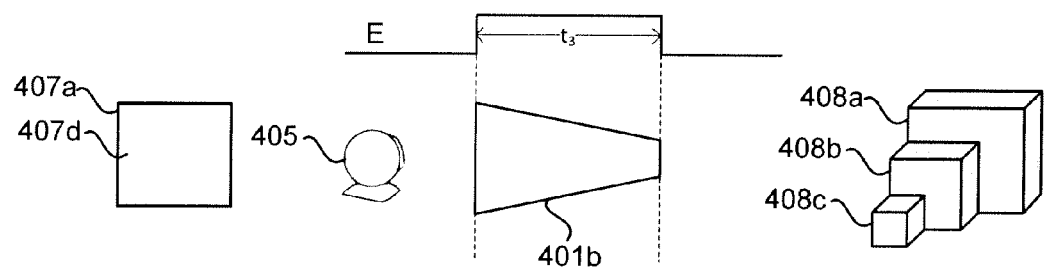
Figure 4F:
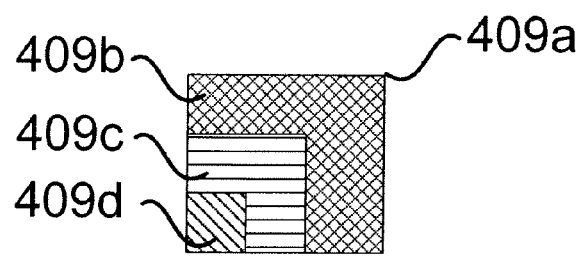
Figure 4:
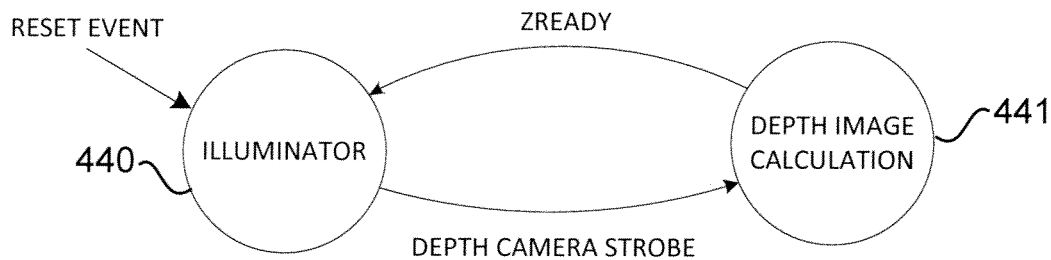

FIG. 2 is a schematic view of an image acquisition, radiation generating, control, processing and communication PCBs as contained by the apparatus and system for use in the 3D depth map generation, interpretation and transmission in accordance with an embodiment of the present invention;

FIG. 3-A is an example embodiment of a computing environment that may be used to implement the control mechanism of an illumination assembly producing a controlled modulated radiation as explained in the diagrams of FIG. 4 for use in 3D mapping, in accordance with an embodiment of the present invention; and, FIG. 3-B illustrates an example embodiment of the illumination assembly comprising the light-emitting diodes (LEDs), the collimator lenses, the filter and the disperser.

FIG. 3-C illustrates an example embodiment of an embedded computing environment that might be used in target detection, acquisition, recognition and tracking system in accordance with these embodiments.

FIG. 3-D illustrates an example embodiment of the image acquisition assembly comprising the image sensors, the lens systems, their fixtures, and the radiation filters.

FIGS. 4A-4F are schematic representations of the controlled emitted radiation by the illuminator to be used in 3D mapping, in accordance with embodiments of the present invention.

Figure 4H:
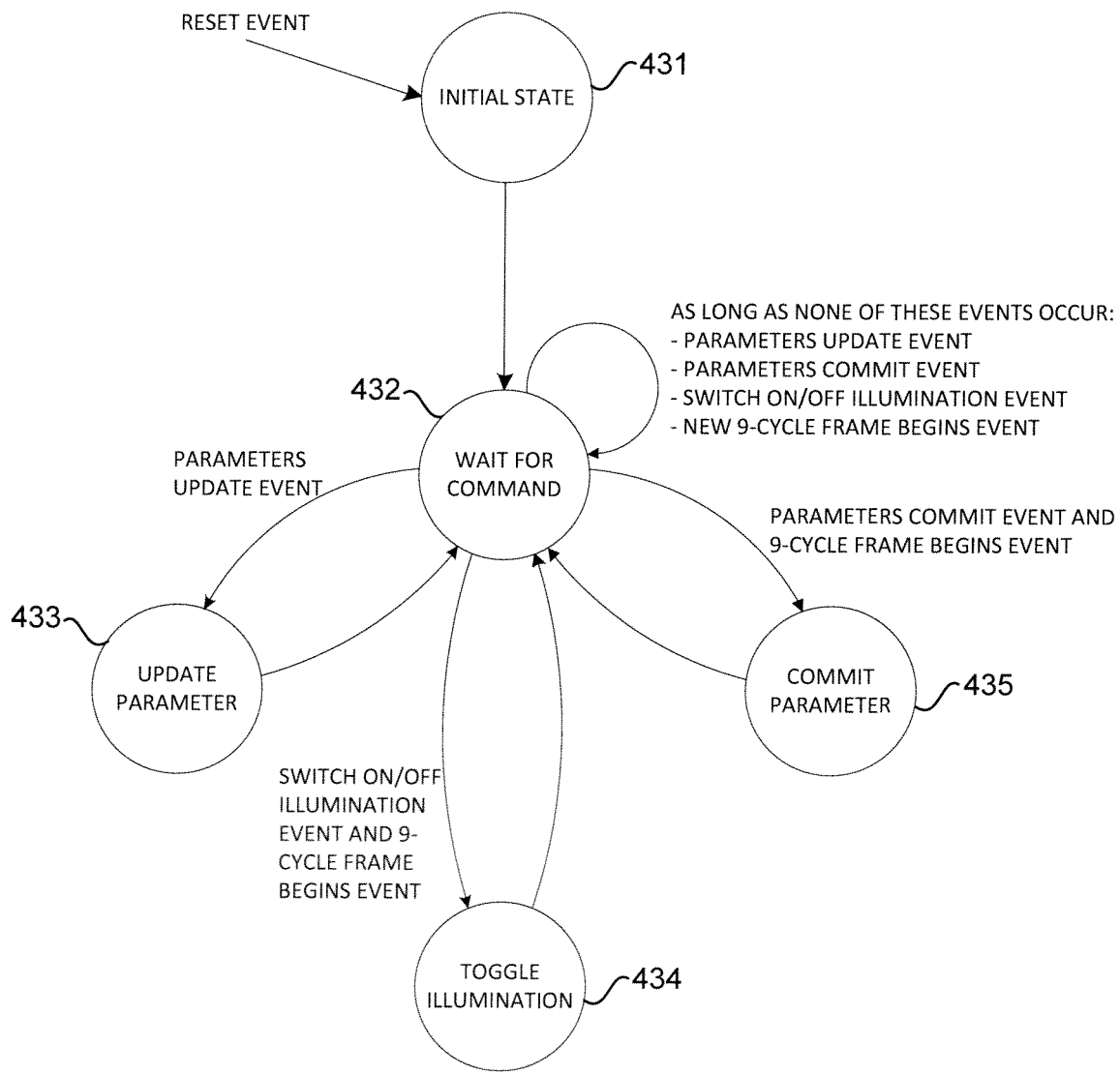

FIGS. 4G-4H are schematic representations of the state machines of the reconfigurable architecture hardware;

FIG. 4I is a flow diagram for a method of the reconfigurable hardware architecture.

Figure 5A:
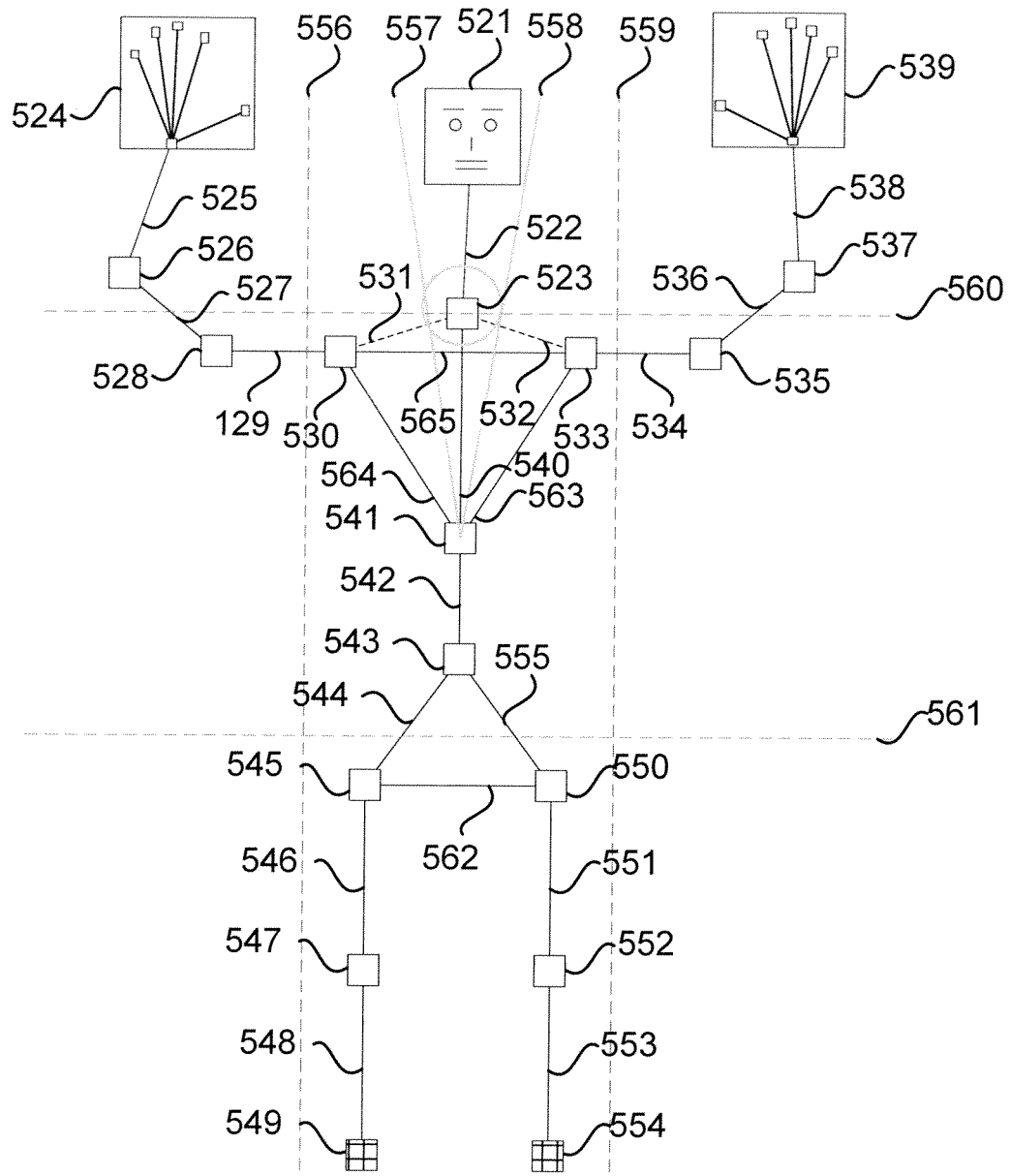

FIG. 5A illustrates a skeletal mapping of a user that has been generated from the target recognition, analysis, and tracking system of FIGS. 1A-1F.

Figure 5B:
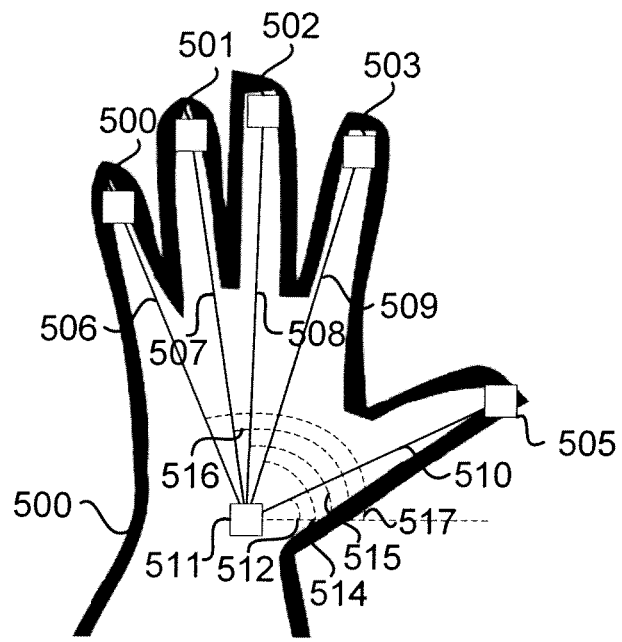

FIG. 5B illustrates a hand mapping of a user hand that has been generated from the target recognition, analysis, and tracking system of FIGS. 1A-1F.

Figure 5C:
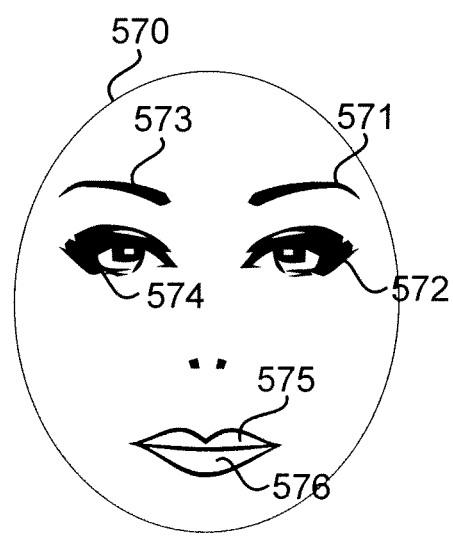

FIG. 5C illustrates a head mapping of a user that has been generated from the target recognition, analysis, and tracking system of FIGS. 1A-1F.

Figure 6:
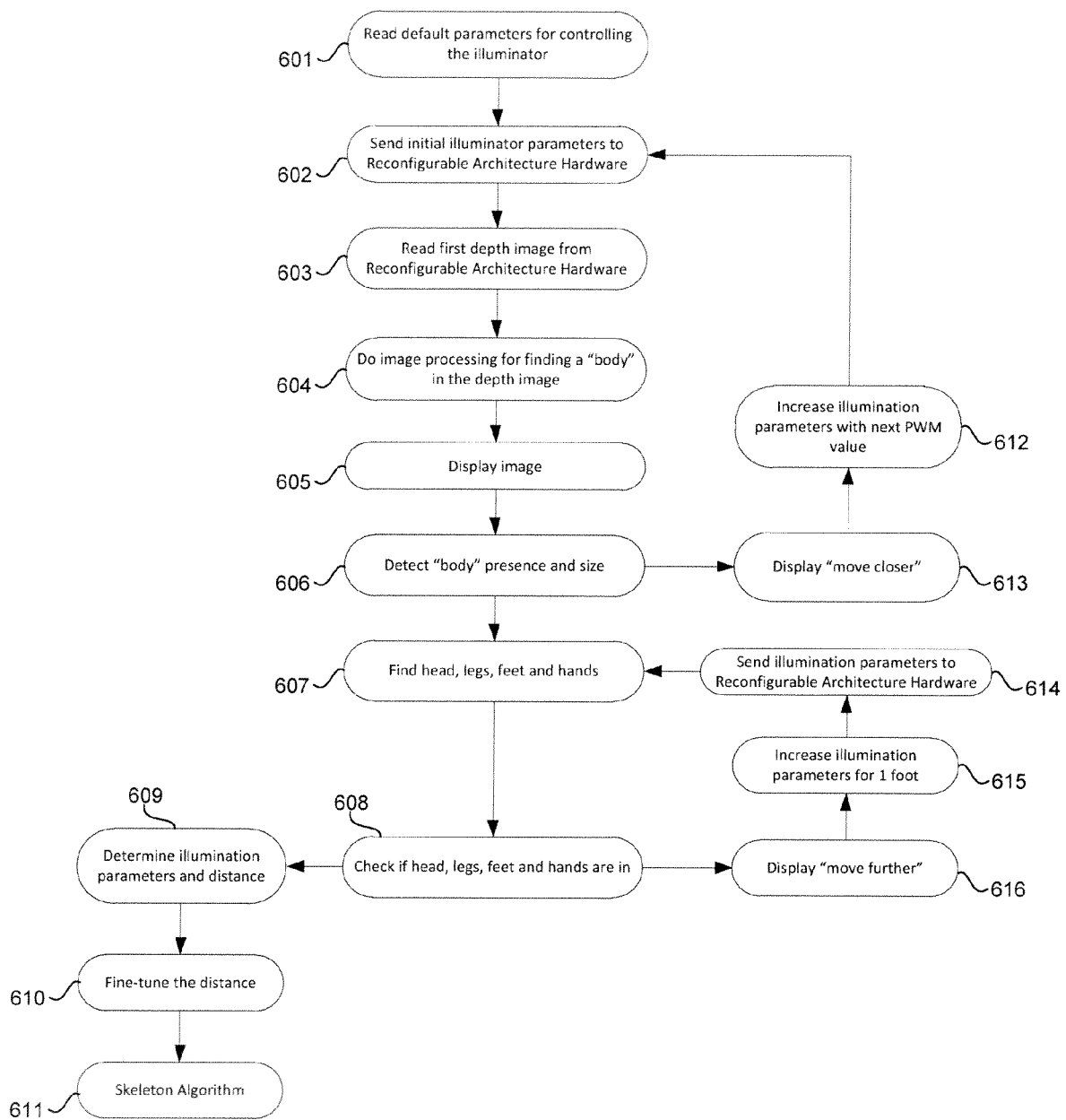

FIG. 6 illustrates how the depth image processing is used by the apparatus for 3D mapping to adaptively tune the illuminator radiation power and automatically calibrate the image acquisition device in relation with the distance of the object to the apparatus.

Figure 7A:
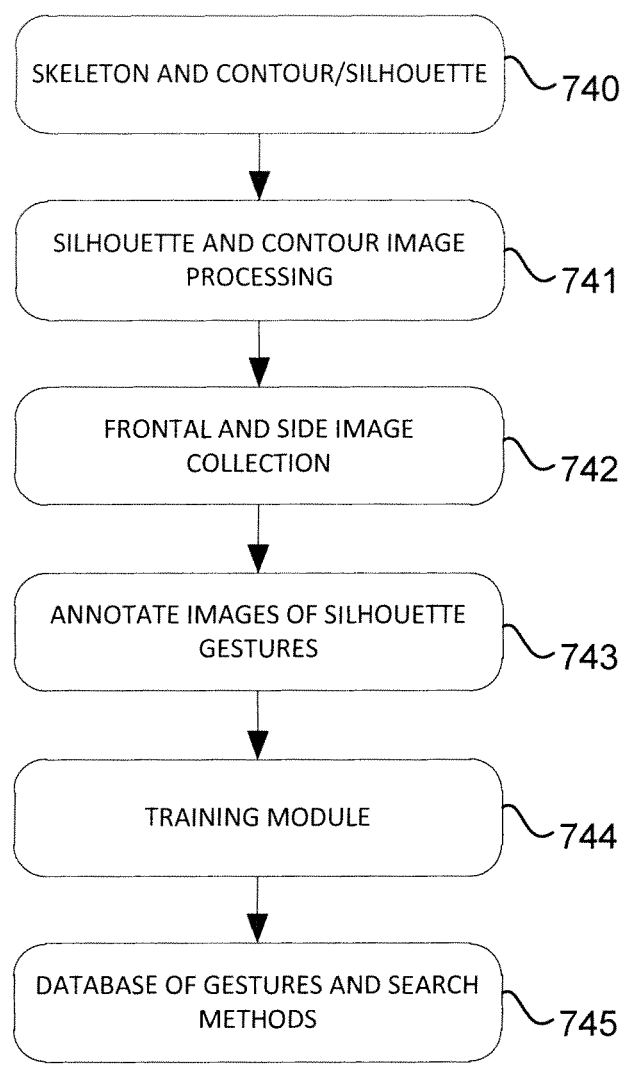

FIG. 7A illustrates a schematic of a pipeline for building a database of gesture based on skeletons and contour/silhouette image processing methods annotated on front and side image collections, obtained from a training module using also the distance to all the points of the target to the apparatus and system and built by the reconfigurable architecture hardware in accordance with the embodiments of the present invention.

Figure 7B:
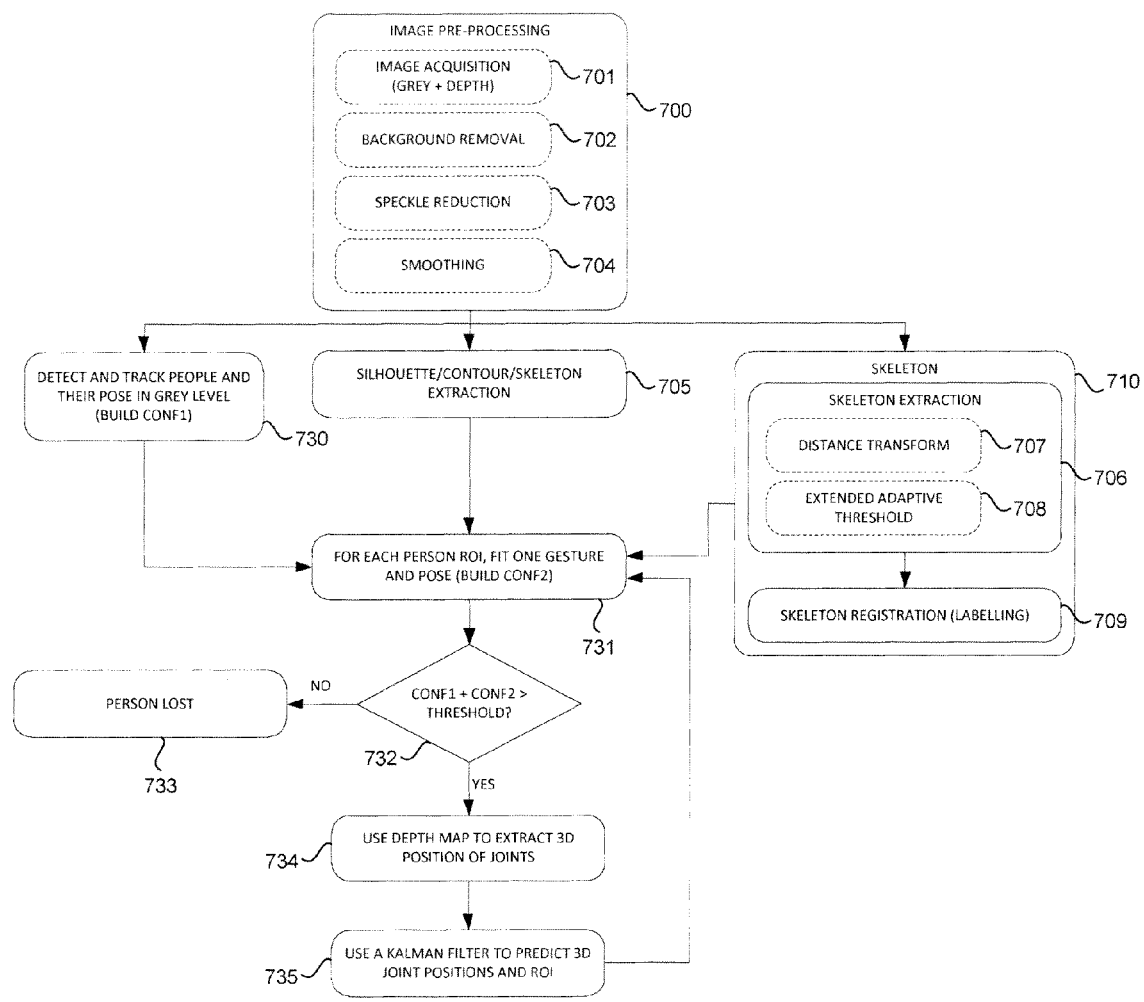

FIG. 7B illustrates a schematic of a pipeline for tracking using a Kalman filter, the parts or only isolated parts of the target movements in time based on the variation of the spatial position of the part of the target where the distance to all the points of the part of the target to the apparatus and system is built by the reconfigurable architecture hardware in accordance with the embodiments of the present invention, and based on calculating of two confidence factors representing the matching measure of the detection of the feature and its identification with its database record done by the software package executed by the processor.

Figure 7C:
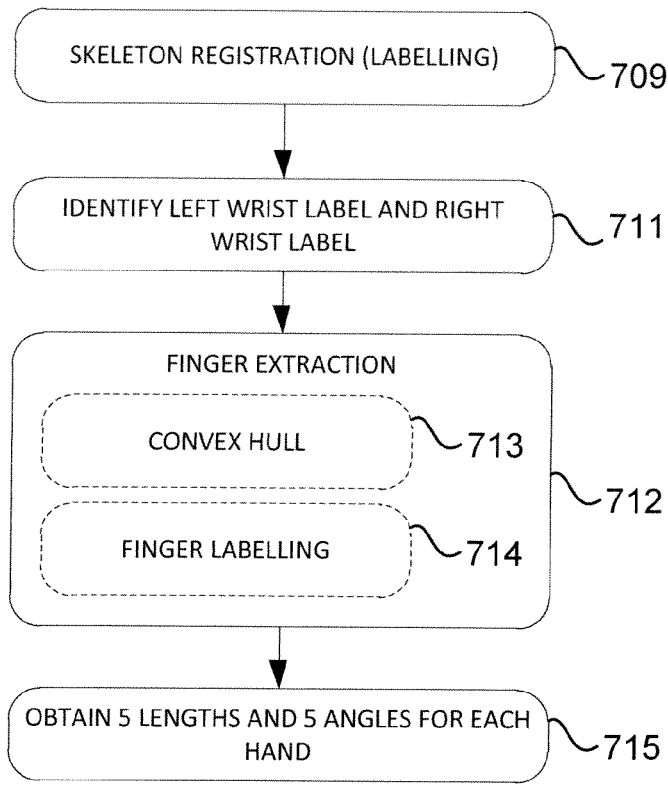

FIG. 7C illustrates a schematic of a pipeline for tracking an isolated part of the target movements in time, based on the variation of the spatial position of the part of the target where the distance to all the points of the part of the target to the apparatus is built by the reconfigurable architecture hardware in accordance with the embodiments of the present invention and the tracking method and the software package embodying it runs on the processor of the present invention.

Figure 7D:
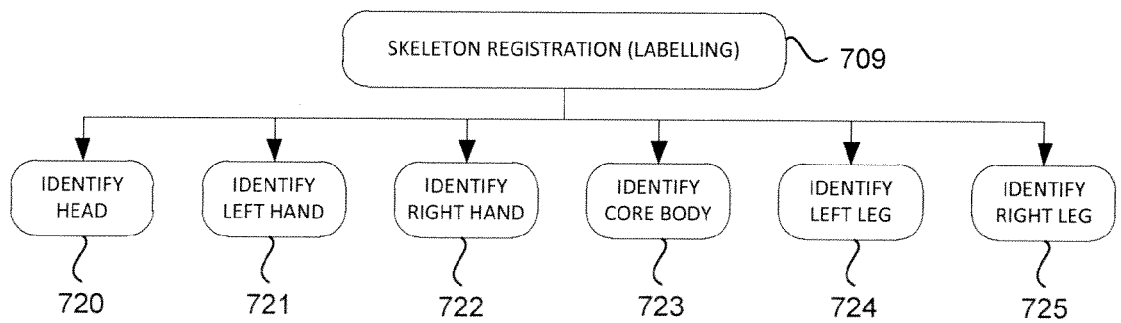

FIG. 7D illustrates a pipeline of methods to use the apparatus and system for gesture identification and control with gestures and body parts movements of various computer applications or electronic devices in accordance with the embodiment of the present invention.

Figure 8:
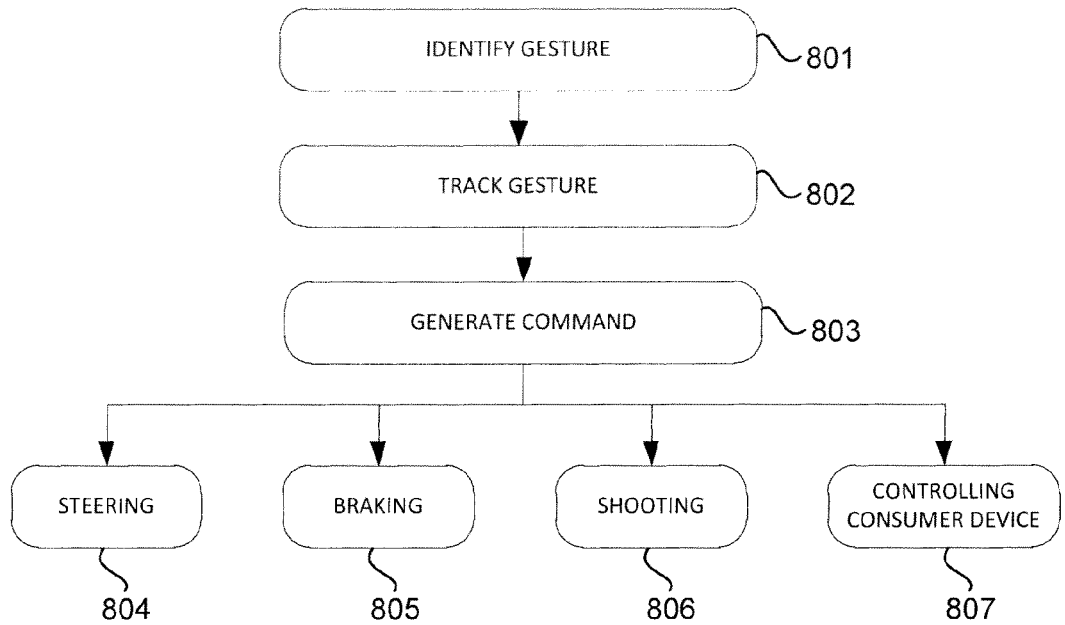

FIG. 8 illustrates a pipeline of methods to use the apparatus and system for gesture, and body parts movement identification and for the control of various computer applications such PC or console gaming or electronic devices in accordance with the embodiment of the present invention.

Figure 9:
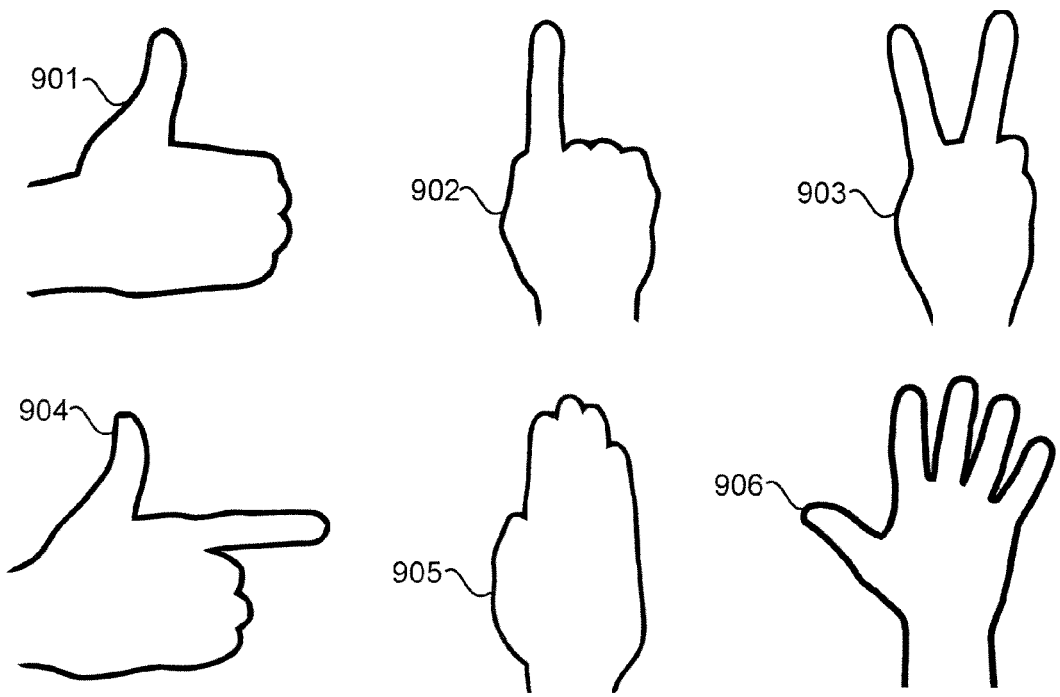
Figure 10A:
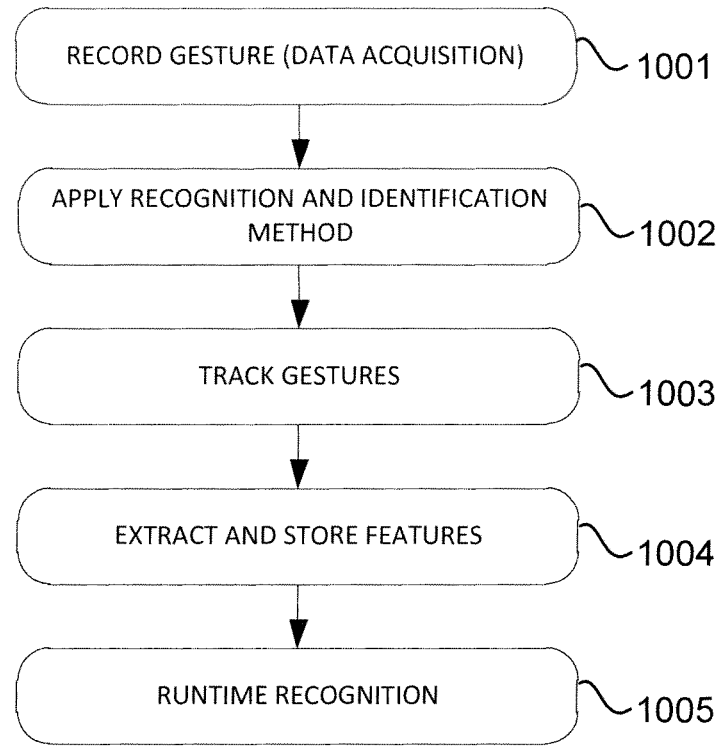
Figure 10B:
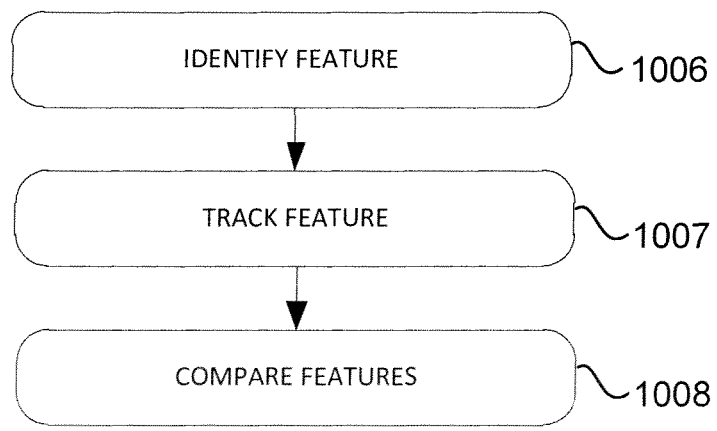

FIG. 9 illustrates without limitations a few samples of the gestures assembled in a gesture language which in this examples is parsed, identified and used for the control of PC or console-based electronic games, or other computer applications and/or for electronic device control in accordance with the embodiment of the present invention FIG. 10A illustrates a pipeline of methods to use the apparatus for the definition of new and ad-hoc gestures or a sequence of gestures and of ad-hoc body parts movement and storage in the apparatus information storage device while FIG. 10B illustrates a pipeline of methods to use the apparatus and system for the identification in real-time of the newly defined gesture or body parts movement for the control of various computer applications such PC or console gaming or electronic devices in accordance with the embodiment of the present invention.

Figure 11A:
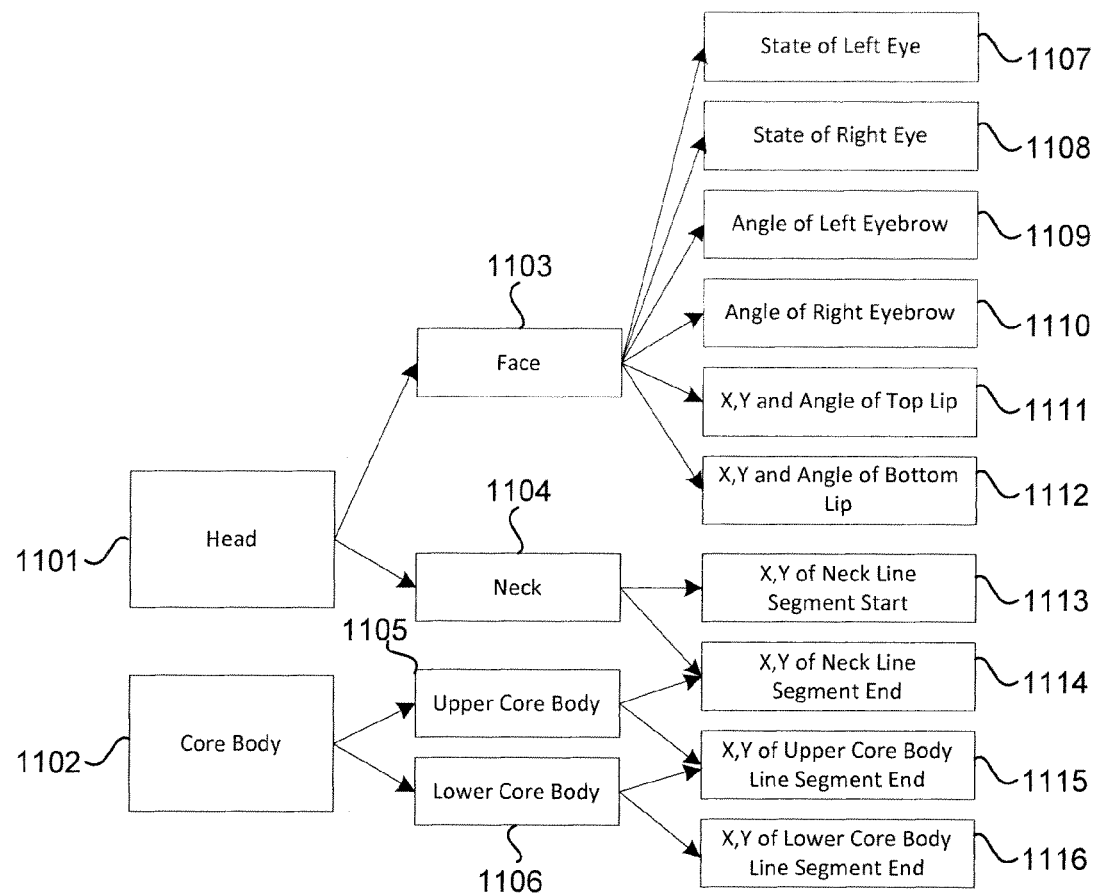
Figure 11B:
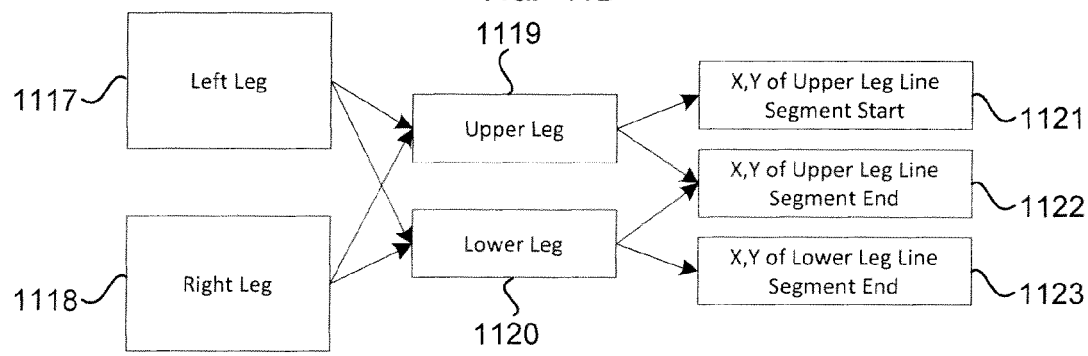
Figure 11C:
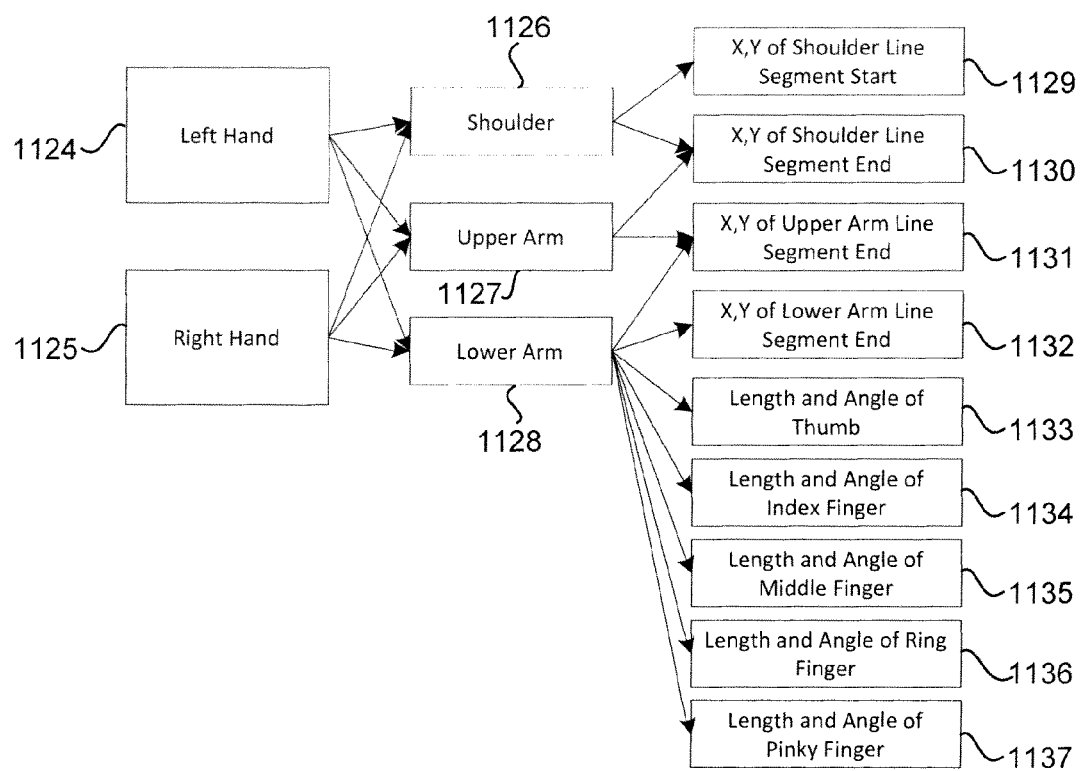

FIG. 11A-11C illustrate pipelines of methods to use the apparatus and system for gesture, and body parts movement identification and provision of an API to a third party device such as PC, processor, or any CPU which uses it for the control of various computer applications such PC or console gaming or electronic devices in accordance with the embodiment of the present invention.

Figure 12:
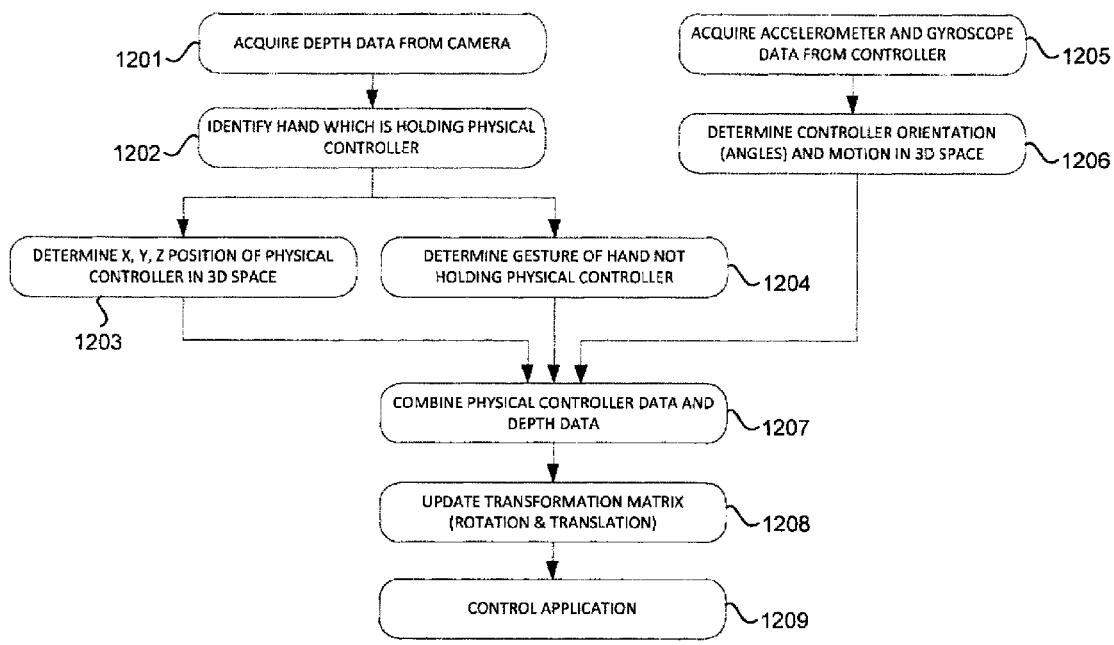

FIG. 12 illustrate pipelines of methods to use the apparatus and system for gesture, and body parts movement identification and fuse the data obtained from the apparatus with data obtained from other sensor devices such as accelerometers, and gyroscopes enclosed for example in a game controller or alike for providing the user's moves a six-degree of freedom and a total immersion of the user's moves and actions in a virtual reality space in order to control various computer applications such PC or console gaming or electronic devices through a virtual reality sequence of actions of either the user avatar, or of the real user image or the user 3D image in the virtual reality space such that the actions in this space are identical to the actions of the user in the real space, in accordance with the embodiment of the present invention.

IV. DETAILED DESCRIPTION OF THE INVENTION

FIGS. 1A-1E are schematic, pictorial illustrations of an apparatus 10 for 3D mapping and detection and recognition of objects which is known as the 3D object reconstruction process, in accordance with an embodiment of the present invention. Apparatus 10 comprises imaging sensing devices 15a and 15b, which produces digital images obtained from reflected radiation produced by an illumination device 14 onto an object 21, 22, 23, or 24 and captures the images of the object produced by the radiation reflected by the object onto the image sensing devices 15a and 15b. The 3D map is calculated by the reconfigurable architecture hardware, which in this present embodiment is located on the board 17 where the processor is also located. This location of the reconfigurable architecture hardware and of the processor is made here by way of example and not by way of limitation. The reconfigurable architecture hardware comprises the image acquisition device and the 3D mapping device in some embodiments. In some other embodiments the reconfigurable architecture hardware can also comprise image processing methods for processing the 3D maps of one or more objects. The method of creating the 3D map of one or more objects comprises a series of image acquisition steps during which radiations of variable frequencies and intensities are applied, and by processing iteratively pairs of acquired images, until complete images of the object or objects are obtained and the formula described at the paragraph 0 is applied to the last pair or resulting images. The 3D map building method comprises further the method used to linearize and interpolate the distances obtained up to a desired number of bits, and eventually mapping the distance of very pixel to the device in a colored or gray level coded image. The depth image is further analyzed by the hardware 17 of the device using methods specific to image processing and machine vision for the detection, analysis and identification of gestures defined by the user hand 28, fingers 13, head 30, legs 27 and other body parts movements which are eventually converted into commands controlling either electronic devices which include TV sets 11, set-top boxes 12, game consoles 26 or computer applications which include PC 19 or console 26 based games, digital signage applications, medical or educational applications and others through either a wireless or IR connecting devices 16 or through an USB connection 20. In all cases, a monitor 11 is used to display the result of controlling the consumer electronic devices or computer applications. Details of the design and operation of apparatus 10 are shown in the figures that follow and are described herein below with reference thereto.

In some embodiments, an illumination device 14 projects a controlled modulated radiation onto the object which can be in 21, 22, 23 or 24 hypostasis. In the context of the present patent application and in the claims, the term controlled modulated radiation refers to a train of modulated pulses of a specific radiation whose frequency, duty cycle, and intensity are controlled in correlation with the parameters of the image sensing device 15b. The radiation pulses are controlled in the sense that the control of the radiation function follows a monotonic increasing function in correlation with the electronic gain and timing parameters of the image sensing device 15b. The illumination device parameters are calculated by the processor applying iteratively image processing methods on the 3D map produced by the reconfigurable architecture hardware, until an optimal image is obtained. Another image sensing device 15a provides an RGB image which is further used to provide images for the head and face identification method as presented in FIG. 5C and FIG. 11A.

In some embodiments, a reconfigurable hardware architecture device 304 of FIG. 3A contained also on the schematic of FIG. 3C as 304, may be implemented physically by an FPGA, or a SoC, or an ASIC or alike, placed on the Processing Board 17, processes the images produced by the image sensing device 15b building the depth map of object 21, 22, 23 or 24 following the process shown in FIGS. 4A-4F. The reconfigurable hardware architecture is programmed in software such that it produces dynamically adjustable hardware depending on the application domain for the device and systems in accordance with the embodiment of the present invention. The term "3D map" refers to a set of 3D coordinates representing the visible surface of the object 21, 22, 23 or 24. The derivation of such a map based on image data is referred to herein as "3D mapping" or equivalently, "3D object reconstruction.". The 3D coordinates of the object 21, 22, 23 or 24 are of points on the surface of one of the objects above by applying the method represented in FIGS. 4A-4F illustrating the process of defining a depth width around the object and its position in the FOV of the device and system. The depth is calculated taking a configurable number of images of the object either 21, 22, 23 or 24 produced by the reflected radiation of the surface of that object and retaining two images one which is the image of the closest points of the visible object surface and one which corresponds to the farther points of the visible surface of the object. These methods may be implemented, mutatis mutandis, using other two images produced by the image sensor 15b of FIGS. 1A-1F.

In one embodiment the functionality of the reconfigurable architecture hardware 304 of FIG. 3C, is controlled by the state machine of FIG. 4H whose state space contains two states: the ILLUMINATOR STATE 440 and the DEPTH IMAGE STATE 441. The ILLUMINATOR STATE 440 controls the functionality of the Illuminator device 30 of FIG. 3C or 3A. The ILLUMINATOR 440 state is triggered by the DEPTH IMAGE calculator by raising the ZREADY event to 1. When ZREADY takes the value zero the ILLUMINATOR 440 is reset. For control purposes there is a RESET EVENT provided which also resets the ILLUMINATOR 440 from a console or PC. Once triggered by ZREADY=1, the ILLUMINATOR 440 triggers the radiation device to illuminate the scene with a frequency and duty cycle which are established by the processor and memorized in the appropriate registers of the reconfigurable architecture hardware 304 of FIG. 3C. The DEPTH IMAGE CALCULATION automaton programmed in hardware inside the reconfigurable architecture hardware 304 of FIG. 3C is presented in the flow diagram of FIG. 4I and described hereafter.

In the same embodiment the ILLUMINATOR functionality is described by the automaton which part of the reconfigurable architecture hardware 304 of FIG. 3C and shown in more details in FIG. 4H. According to the present embodiment the ILLUMINATOR is triggered by the RESET EVENT generated either by the DEPTH IMAGE CALCULATOR automaton 441 of FIG. 4G or by the user. The RESET EVENT brings the DEPTH IMAGE CALCULATOR 441 into the INITIAL STATE 431 of FIG. 4H, and after 10 time cycles into the WAIT FOR COMMAND state 432. As long as none of the following signals are true: PARAMETERS UPDATE EVENT, PARAMETERS COMMIT EVENT, SWITCH ON/OFF ILLUMINATION EVENT, NEW NINE-CYCLE FRAME BEGINS EVENT, the ILLUMINATOR automaton remains in the same WAIT FOR COMMAND 432 state. When the event PARAMETERS COMMIT EVENT AND 9-CYCLE FRAME BEGINS EVENT is true the ILLUMINATOR automaton enters in the COMMIT PARAMETER state 435. When all parameters are committed then the automaton passes automatically in the WAIT FOR COMMAND 432 state. From the WAIT FOR COMMAND 432 state the ILLUMINATOR automaton goes to the TOGGLE ILLUMINATION 434 state as a result of the SWITCH ON/OFF ILLUMINATION AND 9-CYCLE FRAME EVENT being both true. When the TOGGLE ILLUMINATION 434 state is done the ILLUMINATOR automaton regains the WAIT FOR COMMAND 432 state. Also from this state the ILLUMINATOR automaton allows the passage to the UPDATE PARAMETER 433 state by the PARAMETERS UPDATE EVENT being true.

In one embodiment the reconfigurable hardware architecture implements the method shown in the flow diagram of FIG. 4I. According to this flow diagram the image produced by the image acquisition device 304 of FIG. 3C is acquired by the reconfigurable architecture hardware in series of eight or four images as in FIG. 4I by the sequence of instructions IMAGE ACQUISITION 410, 420, 421, 424 and 427, for example, for a number of times depending on the configuration of the device and system which is based on a configurable precision for depth measurement. Initially the reconfigurable architecture hardware acquires a background image which is used by the apparatus and system to process a BACKGROUND SUBTRACTION 411, 422. 425, and 429 operation on all subsequent images produced by the image acquisition device 304 of FIG. 3C under different and monotonically increasing intensity of the radiation producing device 32 of FIG. 3A. Every image obtained by the background subtraction operation is then thresholded by the THRESHOLD operation 412, 421, 426, and 429 for example with a fixed threshold which is configurable, then submitted to an XOR 414, 416, and 418 operation, for example, applied on the thresholded image pixels and on the image produced in the previous iteration step. A mask calculated through the MASK operation 413, 415, and 417, for example, which are the image binary pixels obtained after the threshold operation is used to eliminate the pixels of the image obtained at the precedent step of the calculation of the depth image. After the mask step is completed, the image obtained is a union of all previous mask operation output. This image is called a Primary(i) image and indexed with the natural number of the image acquisition step. At the end of the eight step the depth image is calculated from the Primary8 image and from the Primary5 (or Primary4) renamed as the Secondary image. The depth image is obtained by the DEPTH CALCULATION FORMULA operation 430. The formula used for depth calculation is as follows:

$$d = \frac{vT_s I_+}{4(I_+ + I_-)} - \frac{vt_p}{2}$$

where the following symbols were used:
d=the depth of the pixel
$I_+$=Intensity in the primary frame
$I_-$=Intensity in the secondary frame
$T_s$=Intensity modulation period; for example $T_s$=250 ns=250e-9 s (adjustable)
$t_p$=Time offset; for example $t_p$=60 ns=60e-9 s (adjustable)
v=Speed of light in free space=3e+8 m/s The processor 305 may comprise a special-purpose and programmable processor which is programmed in software to carry out the functions described herein below. The software may be downloaded to processor 305 in electronic form, over a network, for example, using the network connections 307 or 308 of the board 18 of FIG. 1A-1F or it may alternatively be provided on tangible media, such as an electronic information storage device. Some or all of the processing functions of processor 305 may be performed by suitable dedicated circuitry within the housing of the apparatus and system or otherwise associated with the apparatus and system.

The 3D map generated by reconfigurable architecture hardware 304 may be used for a wide range of different purposes. In some embodiments, the 3D map is sent to the processor 305 which can either send it to a display device 11, which shows a pseudo-3D image of the object 21, 22, 23 or 24 or may be further processed by the reconfigurable architecture hardware, or the processor 305 for controlling either external electronic devices as in FIG. 1A or 1B, or interactive computer applications, such as a game, or a game console, or a digital signage application, or a learning application by translating the gesture language of the user in commands for controlling all the above. Alternatively, apparatus and system whose electronic schematic is shown in FIG. 3C may be used to create 3D maps of objects of any types, which can be seen in the FOV for immersing them in any application in which 3D coordinates are needed for interacting with the electronic world.

FIG. 2 is a schematic top view of device 200, in accordance with an embodiment of the present invention. An image sensing device comprising two image sensors 206a and 206b produces two different images of the object 208 placed in the FOV of the apparatus, one 206 b which is an RGB VGA (640×480 pixels) or a full HD (1920×1080) image sensor, if configured accordingly by the reconfigurable architecture hardware placed on the Processing Board 204 of the apparatus and system, and a full VGA or QVGA (320×240) 206a black and white (BW) image sensor depending on the configuration of the device. An illumination assembly 207 in the apparatus 200 comprises a light source 207a which may be a point source, such as a laser, or a light emitting diode with additional collimating lens and a disperser, which are used in combination to project the radiation produced by the illuminator device onto object 208. In the context of the present patent application and in the claims, the term "disperser" means a plastic opaque foil. A communication board 205 provides the possibility of interconnecting the apparatus with other devices such as PCs, gaming consoles, TV sets, set-top boxes, robots, laptops, mobile devices such as mobile phones, iPads, PDAs, or alike. The communication is implemented via an USB port 201, a Wi-Fi port 202, or an Ethernet port 203. In some embodiments the communication board might be omitted from the apparatus, and in some other embodiments might contain either the port 201, or 202 or 203 or a combination of thereof.

Light source 32 of FIG. 3A or 207 in FIG. 2 is controlled by the LED Control Circuit 31 driven at its turn by the reconfigurable architecture hardware 30 in order to produce and project optical radiation onto object 208. The terms "light" and "optical radiation" in the context of the present patent application refer to any band of optical radiation, including infrared and ultraviolet. In some applications, however, near-infrared light is preferred on account of the availability of suitable sources and detectors and the fact that the controlled modulated radiation is invisible to human viewers, and can be contained in a proper way such that it is not harmful to human eyes or skin. In the configuration shown in FIG. 2, and FIG. 3A the elements of the light source 32 are point sources, meaning that the rays of radiation emitted by the light source emanate from a locus small enough so that a homogeneous field of radiation is generated and the radiation projected onto object 21, 22, 23 or 24 is uniform such that the reflected radiation is also as uniform as possible. For this purpose, light source 32a may comprise, for example, a coherent source with large angular divergence, such as a laser diode. When such a radiation point source is used, the optics of the apparatus, comprising the lenses and radiation filters has to be chosen such that the object is all visible in the FOV.

An image sensing assembly 206 produces a series of images of the object 21, 22, 23 or 24 with a variable speed, which can be as high as 240 frames per second (fps). Assembly 206 comprises objective optics 206a for the chosen radiation and 206b, which focus the image onto an image sensor 42. Typically, sensors 206a and 206b comprises a rectilinear array of detector elements, such as a CCD or CMOS-based image sensor array. Assembly 206a may also comprise a band-pass filter calculated for the wavelength of the radiation, chosen and positioned so that sensor 206a receives only radiation in the emission band of radiation source 207a. The band-pass filter is calculated such that the other radiations produced by the ambient light or other radiation sources are filtered out.

In the embodiment shown in FIG. 2, illumination assembly 207 and image capture assembly 206a and b are held in a fixed spatial relation. This configuration and the processing techniques used by the reconfigurable architecture hardware 30 of FIG. 3A make it possible to perform 3D mapping using the single image capture assembly, without relative movement between the illumination and image capture assemblies and without moving parts. Alternatively, the techniques of illumination and mapping that are described herein below may be used in conjunction with other sorts of image capture assemblies, in various different configurations, such as those described in the Background section above.

The 3D map of object 21, 22, 23 or 24 is generated by the reconfigurable architecture hardware of FIG. 3B by processing a number of pairs of images following the method illustrated in FIGS. 4A-4F, images which were collected by the sensor 206a, such that at the final stage of the method implemented in the firmware of the reconfigurable architecture hardware the 3D map of the visible surface of one of the objects 21, 22, 23 or 24 is obtained. The 3D map is obtained by calculating arithmetic sum and difference and then calculating the ratio of the result of the difference operation over the result of the sum operation applied to two intermediate images, i.e. the brightest one called the primary image and a medium intensity one called the secondary image. In some embodiment the secondary image can be even the last image obtained by the reconfigurable architecture hardware as a result of processing the last pair of images.

FIG. 3B is a schematic top view of an illumination assembly 33, which may be used in device 200 of FIG. 2 in place of assembly 207, in accordance with an alternative embodiment of the present invention. In this embodiment, the illumination device is made out of a number of light-emitting diodes (LED) 34a-c—their number depending of the specific application domain—with suitable optics 35a-c and 36. The configuration and locations of optics 35a-c and 36 in FIG. 3B are arbitrary, and any suitable sort of projection optics may be used to project the controlled modulated radiation onto object 21, 22, 23 or 24 using light from LED 34a-c. As in assembly 33, the elements of illumination assembly 31 may be fixed within the housing of the assembly through a mechanical part 32 or the like. The use of LED 34a-c in assembly 33 is advantageous if placed in a proper mechanical enclosure for reducing the size, cost and heat dissipation of the assembly, as well as improving the mean time between failures (MTBF) and overall reliability of the assembly. Furthermore, because the LEDs emit radiation of a fix wavelength, a properly selected optical filter which passes only the radiation through the lens system prevents ambient light to affect the process of 3D mapping. By similar reasoning, a properly selected optical filter for the RGB sensor cuts the above radiation from the wave spectrum of the lens system such that the RGB image is not affected by the radiation emitted by the LEDs.

As described herein, a user may control an electronic device such as a TV set, a set-top box, a PC, game console, a mobile phone, a laptop, or alike, or a computer application such as a PC game, a digital signage, a medical information system, a learning tool, and alike, executing on a computing environment, such as a game console, a computer, or the like, by performing one or more gestures which might be assembled in a gesture language or considered independently by the gesture recognition application. According to one embodiment, the data representative of a gesture, such as depth image of a scene, may be received by, for example, an image acquisition device. In one embodiment, the device making the object of the patent and the image capturing device of the system, or the reconfigurable architecture hardware, or the processor coupled to the image acquisition device may determine whether one or more targets or objects in the scene corresponds to a human target such as the user or if many, the users of the device and the system. The object in the scene is then evaluated in order to decide whether or not that object is a human target by comparing the results of applying image processing procedures on the depth image in order to obtain a stable representation through a measure of that image such as the skeleton or alike, with the skeleton pattern of the image of a human user which is stored in the information storage device of the processor. As will be described herein, a user may control an application executing on a computing environment, such as a game console, a computer, or the like, by performing one or more gestures. According to one embodiment, the data representative of a gesture, such as one or a series of depth images of a scene, may be received by the processor. In other embodiment, the image can be received by a computing system coupled to the device and the system, and the computer system may determine whether one or more targets or objects in the scene corresponds to a human target such as the user. To determine whether a target or object in the scene corresponds to a human target, each of the targets may be thresholded and compared to a pattern of a human body model as described above. Each target or object that matches the human body model may then be processed at run-time to dynamically generate a model in form of a skeleton or alike as described in FIG. 5 and associated therewith the user or with the users. The user's (or users') model may then be tracked dynamically in real-time and an avatar associated with the model is animated corresponding to the pose, gesture, or movements made by the user to control a game or to execute an action in any virtual reality environments or electronic devices, such as TV sets, set-top boxes, laptops, mobile phones or devices or alike.

FIG. 5 is a schematic representation of the skeletal mapping of a user that may be generated by applying image processing operation on the data captured by the image acquisition device 326b of FIG. 3. In this embodiment, the firmware implemented in the reconfigurable architecture hardware or at the processor level, performs image processing operations on the depth image which is calculated in real-time by the reconfigurable architecture hardware. The processor firmware and software packages calculate the straight lines and points of the skeletal image obtained from the depth image, through a combination of image processing methods whose result provide data for depicting the bones 525, 527, 536, 538, 546, 548, 551, 553 of the user's body, and the points where the bones join 526, 528, 537, 535, 545, 547, 550, 552, identifying, each hand 524, 539, each forearm 525, 538, each elbow 526, 537, each upper arm 527, 536, each shoulder 528, 535, each hip 545, 550, each thigh 546, 551 each knee 547, 552 each foreleg 548, 553, each foot 549, 554, the head 521, the torso represented by segments of the two triangles 523, 530, 533, and 541530,533, the top 523 and bottom of the spine represented by the triangle 543, 545, 550, the waist 543, and the bones and joints of the tips of the fingers 500, 501, 502, 503, 505, and the skeleton of the fingers 506, 507, 508, 509, and 510 when the hand gestures are interpreted based on fingers movements with the angles 512, 514, 515, 516, 517, calculated with respect to a joint point 511 as shown in FIG. 5B. Also individual features of the face FIG. 5C, such as the shape 570, the nose 580 and eyes 574, 571, the eye lids 572,574, and the position and the moves of the lips 575, and 576.

FIG. 6 depicts a flow diagram illustrating a method used by the reconfigurable architecture hardware to adaptively controlling the radiation intensity emitted by the LEDs 32a of FIG. 3A by using controlled-modulated pulses. In this embodiment, the processor 305 of FIG. 3C, starts the process of adaptively controlling the intensity emitted by the LEDs 32a of FIG. 3A by sending the default parameters to the reconfigurable architecture hardware according to the method 601 and 602. The processor 305 of FIG. 3C detects the human body in the depth image according to the item 694 of FIG. 6 which is displayed 605, and analyze in terms of the body signatures, as body size, arm and feet length, and sending messages to the user 613 and modify the illuminator parameters 612, then locating all body parts of the user again 607 and checking the integrity of these parts 608, displaying messages to the user 616 in order to place the user properly in the field of view 616, tune the illumination parameters 615, installing them in the registers of the reconfigurable architecture hardware 614, calculating the final illumination parameters and distance 609, and 610 to make the camera ready for being used in the next stage of the method used to analyze the depth image 611 and identify commands signals made by the human user making hand gestures or moving body parts.

FIG. 7A depicts a flow diagram illustrating an exemplary process for image pre-processing 700 for obtaining the depth image data 701 from the reconfigurable architecture hardware and processing the data to obtain characteristic features such as contour/silhouette and/or skeleton data. The data is pre-processed by the module 700 in which a hardware/software interface and a special protocol between the reconfigurable architecture hardware and the processor concur to the depth image acquisition by the processor, a background subtraction module 702, a speckle reduction module 703 and a smoothing module 704 work sequentially and in parallel in order to prepare the depth image for further processing. The processor further processes in parallel the depth image in order to obtain the silhouette/contour by the 705 module and the skeleton by the 706 module. Using the silhouette/contour and the skeleton a confidence factor is built for each contour of every player by the module 730 and for the user skeleton through a labeling procedure 731 based on the skeleton registration 709. The features are tracked by the module 735 which uses the comparison of the confidence factors with a threshold 732, and the depth data obtained by the reconfigurable architecture hardware and extracted by the module 734.

FIG. 7B depicts a flow diagram illustrating an exemplary process 701 for obtaining the depth image data from the reconfigurable architecture hardware and processing the data to obtain characteristic features such as skeleton and contour/silhouette 740 images by applying corresponding silhouette and contour calculation methods 741 which find various gestures and body poses from frontal and side postures 742 of the user by using a training module 744 which eventually will be produce gesture and body parts signature in a database 745 stored in the processor information storage device 303 of FIG. 3C and which will be used for the real-time matching and tracking of the gestures and body parts movements, according to an embodiment of the disclosure.

FIG. 7C depicts a flow diagram illustrating an exemplary process for identifying the gestures made by the number and position of fingers used to create that gesture. Using the skeleton information obtained as per FIG. 7A, the module 711 identifies and separates the right and left hand wrists, while module 712 extracts and identifies the finger by first building a convex hull 713, and labeling each finger 714. The results are further processed by identifying the vertices of the convex hull and tracking the fingers with module 715.

FIG. 7D depicts a flow diagram illustrating an exemplary process for identifying various body parts of the user from skeleton labeled data provided by the module 709, identifying the head by the module 720, the left 721, and right 722 hand, the body 723, the left 724, and the right 725 leg.

FIG. 8 depicts a flow diagram illustrating an exemplary process for identifying gestures as per module 801, while the gestures are tracked by module 802 which generates a specific command 803 for controlling steering 804, braking 805, shooting 806 and other type of scenes in a PC or console game; or for controlling a consumer electronic device such as a TV or set-top box, a laptop, a cellular or alike.

FIG. 9 shows a series of gestures part of a gesture language shown in the figures 901-906 or alike which are displayed at the beginning of the game or in a description of the controls of the consumer electronic device such as the TV set, set-top box, laptop, mobile phones or alike. The user is given the possibility to accept preset commands, or to synthesize the one he/she considers appropriate for his/her ability to produce sequences of gestures assemble through rules like in any sign languages.

FIG. 10A depicts a flow diagram illustrating an exemplary process for identifying in real-time new gestures as defined by the user, through recording them in the information storage device of the apparatus and the system 1001, applying recognition and identification methods 1002, comparing it or them with existing gestures, tracking it or them 1003, extracting and storing new features 1004 in the feature database and including it or them in the gesture language of FIG. 9, and such that the gesture becomes recognizable in real-time 1005.

FIG. 10B depicts a flow diagram illustrating an exemplary process for identifying in real-time feature/gesture with the apparatus and system, 1006, applying gesture recognition procedure using IR images and the depth map, tracking it or them 1003, compare it or them with existing feature stored in the information storage device, and synthesizing the control to be applied to the PC or console game, or to consumer electronic devices.

FIGS. 11A, 11B, and 11C depicts in a diagram the apparatus and system capability of delivering commands to the PC or console games based on the interpretation of the standard output from the processor 305 of FIG. 3C and encoded in an Application Programming Interface (API). In accordance with some embodiments of the present invention, the apparatus and system provides the depth map and the RGB image of the user or users present in the FOV, and the control data needed by a third party apparatus or PC application. The data provided by the apparatus appears as a metadata on the top of the array of data shipped out via the USB 201 or Wi-Fi connectors 202 or Ethernet 203, as shown in FIG. 2. The data is provided as an API where the Head 1101 is described by the Face 1103 features comprising the state of the left eye 1107, and right eye 1108, angle of left eyebrow 1109, and/or right eyebrow 1110, angle of top lip, 1111, and bottom lip 1112, the Neck 1104 defined as the point where a segment of the neck skeleton starts 1113, and ends 1114, the Core Body defined as the Upper Core Body 1005 and the Lower Core Body 1006, also defined by the start point of the line segment of the skeleton where the upper body starts 1114 as it coincides with the neck segment end 1115, and lower core body start 1115, and end 1116. The FIG. 11B shows the leg API such as the left leg 1117 comprising the Upper Left Leg 19, and Lower Left Leg 1120, defined by the upper leg line start 1121, and end 1122, and lower leg start 1122, and end 1123, and the same for the Upper Right Leg.

FIG. 12 depicts a flow diagram illustrating an exemplary process for the fusion in real-time of the data obtained by the apparatus and system in regards to the gesture made by the user and the acceleration of the hand which holds a game controller endowed with accelerometers and gyroscopes. The apparatus and system acquires user images and builds the depth data using the module 1201, and identifies the hand which holds the physical controller 1202, determines the x, y, z coordinates of the controller placing it in a 3D space, and also determines if the other player's hand is used by the player in the game 1204. A module 1205 acquires sensor data from the accelerometers and gyroscopes of the controller, or any signal from any other sensors used in any controlled applications, as well as audio signals used by a voice recognition system. A module 1206 in one of the embodiment of the apparatus and system uses the controller orientation, angles, and motion in 3D space. A module 1207 combines physical data obtained from the device, and the controller in a set of data which allows describing the movements of the user in a 3D space for allowing the user 6 degrees of freedom. The module 1208 uses the General Transformation Matrix to relate the reality 3D space with the Virtual Space of the application and eventually the module 1209 applies the result obtained by the fusion firmware and software on the combination of the controller and apparatus and system data onto the PC application, game, console, or the consumer electronic device control interface.

It will thus be appreciated that the embodiments described above are cited by way of example, and that the present invention is not limited to what has been particularly shown and described hereinabove. Rather, the scope of the present invention includes both combinations of the various features or components of the features described hereinabove, as well as variations and modifications thereof which would occur to persons skilled in the art upon reading the foregoing description and which are not disclosed in the prior art.

We claim:

1. An apparatus for 3D mapping images of one or more objects, comprising:
    a. an illumination device having a radiation source which emits radiation pulses varying in frequency, duty cycle and intensity, for irradiating one or more objects present in the field of view ("FOV"), wherein the frequency, duty cycle and intensity are adjusted by the illumination device and wherein the radiation pulses are incoherent and homogeneous radiation;
    b. an optical device for projecting one or more object images onto an image sensing device;
    c. the image sensing device;
    d. a reconfigurable architecture hardware comprising an image capturing device for capturing images of one or more objects from the image sensing device, an information storage device, the reconfigurable hardware for controlling the illumination device and implementing a 3D mapping algorithm generating a 3D map of one or more objects; and
    e. a processor comprising an information storage device, for processing the 3D map of one or more objects.

2. The apparatus of claim 1 wherein the illumination device spatially samples the scene in the FOV by gradually irradiating with radiation one or more objects placed in the FOV of the optical device, and is controlled by the reconfigurable architecture hardware.

3. The apparatus of claim 2 wherein the radiation pulses are unobstructed.

4. The apparatus of claim 1, wherein the reconfigurable architecture hardware further comprises a communication device, the hardware implementing the depth image calculation to calculate a depth field of one or more objects, and the hardware implementing a finite state machine which controls both the image sensing device and the illumination device, and the hardware implementing a second finite state machine for communication with the processor and the external devices.

5. The apparatus of claim 1 further comprising a housing, wherein the illumination device, the optical device, the image sensing device, the reconfigurable architecture hardware and the processor are contained within the housing.

6. The apparatus of claim 1 wherein a plurality of radiation pulses form an image sensor device frame, and the plurality of radiation pulses differ from each other in frequency from frame to frame.

7. The apparatus of claim 6 wherein the plurality of radiation pulses differ from each other in duty cycle and intensity from frame to frame.

8. The apparatus of claim 1 wherein the frequency varies in discrete values.

9. The apparatus of claim 1 wherein the radiation source is a laser and the illumination device comprises a disperser to disperse the radiation pulses uniformly.

10. A system for using a 3D mapping image of one or more objects for controlling electronic devices, comprising:
    a. an illumination device having a radiation source which emits radiation pulses varying in frequency, duty cycle and intensity for irradiating one or more objects in the FOV, wherein the radiation pulses are incoherent and homogeneous radiation;
    b. an optical device for projecting one or more object images onto an image sensing device;
    c. the image sensing device which produces images based on the reflection of the variable light radiation of one or more objects situated in the FOV of the optical device;
    d. a reconfigurable hardware architecture controlling the illumination device comprising an image capturing device for capturing images of one or more objects object from the image sensing device devices, implementing a 3D mapping formula for generating a 3D map of the one or more objects present in the FOV; and
    e. a processor for processing the 3D map of one or more objects for analyzing gestures in order to interpret them through special image processing methods for mapping them into desired commands to control electronic devices.

11. The system of claim 10 further comprising a movement controller, the hardware of which produces signals which measure the movement of hands or other body parts in motion, based on acceleration and rotation of the body parts movement, and which can be read by a processor for building data to implement a "six degrees of freedom" control of external electronic devices, comprising:
    a. an apparatus of claim 1;
    b. a 3D mapping of one or more objects;
    c. a controller which comprises acceleration and rotation transducers; and
    d. a method for fusing the 3D map with the data produced by the controller which comprises acceleration and rotation transducers the combination of the two data sets producing a combined data set permitting thus the control of the environment in 6 degrees of freedom.

12. The system of claim 10 further comprising a plurality of systems communicating over a network allowing two or more system users to interact in controlling electronic devices such that the users can collaborate on controlling in concert or competitively the electronic device or the application which executes on that electronic device.

13. The system of claim 10 further comprising a communication device for sending the result of the processing of the 3D map to the controlled device, the controlled device being any device which can be controlled locally or remotely through a communication protocol specific to the electronic device.

14. A method of irradiating one or more objects comprising the steps of:
    a. controlling an illumination device to project a controlled train of radiation pulses that are varying in frequency, duty cycle and intensity onto the one or more objects, wherein the radiation pulses are incoherent and homogeneous radiation;
    b. adapting the pulses to the distance of one or more objects from the center of the optical device; and
    c. controlling image sensing device parameters according to parameters of the varying in frequency and duty-cycle pulses.

15. The method of claim 14 further comprising the steps of:
    d. establishing illumination device parameters by providing a 3D map to a processor and receiving from the processor the illumination device parameters needed;
    e. using data obtained from the processor for calculating parameters of the depth map calculation algorithm; and
    f. establishing communication with the processor and with an electronic device.

16. The method of claim 14 further comprising the steps of:
  d. detecting and recognizing representative features of a face of one or more objects where the object placed in front of the imaging device is a human; and
  e. identifying the face of one or more humans present in the field of view and using the identified face of the human to further process other parts of interest from the body of the human object.

17. The method of claim 16 further comprising the processing of the depth images for identifying body or component parts of one or more objects comprising the steps of:
  f. obtaining depth image data from a reconfigurable architecture hardware;
  g. processing the data to obtain characteristic features;
  h. applying corresponding calculation methods identifying body or component parts of one or more objects for real-time matching and tracking of gestures and body parts posture or movements; and
  i. mapping a meaning of the gesture or body parts posture or movements onto an action to be transmitted to an external electronic device.

18. The method of claim 16 further comprising the steps of:
  f. identifying a sequence of gestures made by using hands and fingers;
  g. identifying and separating right and left hand wrists;
  h. identifying one or more fingers by applying adequate image processing methods, such as building convex, or concave polygons, or applying classification methods or alike;
  i. labeling each finger;
  j. tracking the fingers;
  k. identifying and interpreting a hand and finger sequence of gesture; and
  l. mapping the meaning of the hand and finger gesture onto an interaction with an electronic device.

19. The method of claim 16 further comprising the steps of:
  f. Identifying a sequence of gestures made by either using hands, fingers or body or body parts posture or movements to create a meaning for any gesture made by the user;
  g. using the face identification, the body or body parts identification or the hand and finger identification results to detect, identify, and interpret the sequence of gestures a gesture which is a combination of face, body or body parts, and hand and fingers movements; and
  h. mapping the result of identifying the meaning of the sequence of gestures gesture or body parts movements onto an action to be transmitted to the external electronic device.

20. The method of claim 19 further comprising the steps of:
  i. recognizing the sequence of gestures gesture made by one or more objects as part of a gesture language stored in an information storage device of the processor;
  j. having defined a gesture language made out by a sequence of gestures, each of which represents the meaning of a natural language word or a phrase, or a sequence of gesture statements, sequence which can be either predefined or assembled by a user of the system;
  k. parsing gestures stored in the information storage of the processor which interprets the gestures defined by the gesture language and assembles them into a command to be sent to electronic devices connected to the system; and
  l. assembling the gesture language out of the predefined gestures representing cues or from user-defined gestures by means of a graphical user interface.

21. The method of claim 20 further comprising the step of:
  m. allowing the user to define its own sequence of gestures gesture or body parts movements comprising the steps of:
    i. detecting, identifying, interpreting, and extracting the cue of the new sequence of gestures gesture as defined by the user;
    ii. integrating the new sequence of gestures gesture in the language parser; and
    iii. storing the new gesture in information storage device.

* * * * *